(12) United States Patent
Yamashita et al.

(10) Patent No.: US 8,120,220 B2
(45) Date of Patent: Feb. 21, 2012

(54) FLUID DYNAMIC BEARING DEVICE AND MANUFACTURING METHOD THEREFOR

(75) Inventors: Nobuyoshi Yamashita, Aichi (JP); Masaaki Toda, Aichi (JP); Kimihiko Bitou, Aichi (JP); Masaharu Hori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 771 days.

(21) Appl. No.: 12/160,326

(22) PCT Filed: Nov. 9, 2006

(86) PCT No.: PCT/JP2006/322363
§ 371 (c)(1), (2), (4) Date: Jul. 9, 2008

(87) PCT Pub. No.: WO2007/080700
PCT Pub. Date: Jul. 19, 2007

(65) Prior Publication Data
US 2010/0231074 A1    Sep. 16, 2010

(30) Foreign Application Priority Data

Jan. 10, 2006 (JP) ................................. 2006-002800
Jan. 19, 2006 (JP) ................................. 2006-011546

(51) Int. Cl.
*H02K 5/16* (2006.01)
*F16C 17/02* (2006.01)
(52) U.S. Cl. ........ 310/90; 29/898.02; 384/100; 384/120
(58) Field of Classification Search .................... 310/90; 384/100, 107, 114, 120; 29/898.02, 898.07, 29/898.09, 898.11
See application file for complete search history.

(56) References Cited

U.S. PATENT DOCUMENTS
5,129,739 A    7/1992    Asai et al.
(Continued)

FOREIGN PATENT DOCUMENTS
JP    4-19421 A    1/1992
(Continued)

OTHER PUBLICATIONS

Japanese Office Action dated Oct. 28, 2010, issued in corresponding Japanese Patent Application No. 2006-343210.

(Continued)

*Primary Examiner* — Quyen Leung
*Assistant Examiner* — David W. Scheuermann
(74) *Attorney, Agent, or Firm* — Westerman, Hattori, Daniels & Adrian, LLP

(57) ABSTRACT

To provide a fluid dynamic pressure bearing device that achieves high rigidity against moment without degradation in assembly precision and bearing performance, bearing sleeves are arranged in an axial direction and coaxiality of radial bearing surfaces formed on inner peripheral surfaces of the bearing sleeves is set to 3 μm or less. This secures width precision between the radial bearing gaps to prevent a degradation in bearing performance and a failure such as wear etc. caused by contact between a shaft member and the bearing sleeves. Further, a first radial bearing surface and a second radial bearing surface are provided on at least one sleeve, and this allows a sleeve assembly constructed from the bearing sleeves to be supported at least three positions in the axial direction in a process of assembling the sleeve assembly. As a result, assembly work can be carried out with two bearing sleeves prevented from being bent at a midway thereof, and highly accurate coaxiality between both the bearing sleeves is secured.

4 Claims, 15 Drawing Sheets

U.S. PATENT DOCUMENTS

| | | |
|---|---|---|
| 6,119,346 A | 9/2000 | Miyasaka et al. |
| 6,769,808 B2 * | 8/2004 | Shih et al. .................... 384/114 |
| 2005/0025405 A1 * | 2/2005 | Tamaoka .................... 384/107 |

FOREIGN PATENT DOCUMENTS

| JP | 9-151941 A | 6/1997 |
|---|---|---|
| JP | 10-9250 A | 1/1998 |
| JP | 10-318250 A | 12/1998 |
| JP | 11-042514 A | 2/1999 |
| JP | 11-269475 A | 10/1999 |
| JP | 2000-230554 A | 8/2000 |
| JP | 2000-320542 A | 11/2000 |
| JP | 2002-295458 A | 10/2002 |

OTHER PUBLICATIONS

International Search Report of PCT/JP2006/322363; date of mailing Feb. 13, 2007.

* cited by examiner

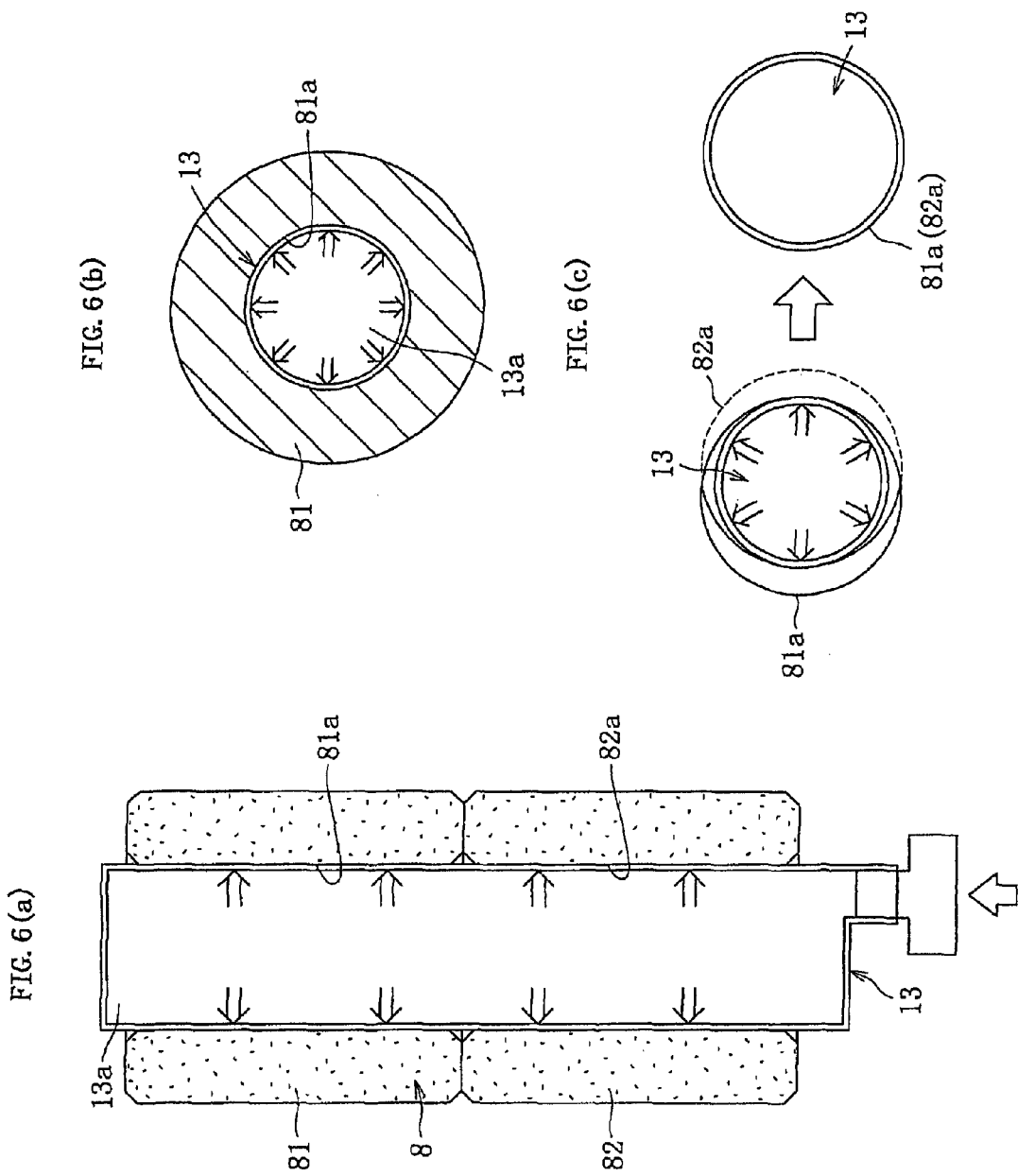

FLUID DYNAMIC BEARING DEVICE AND MANUFACTURING METHOD THEREFOR

TECHNICAL FIELD

The present invention relates to a fluid dynamic bearing device.

BACKGROUND ART

A fluid dynamic pressure bearing device is a bearing device in which pressure is generated by a dynamic pressure action of a fluid (lubricating fluid) generated in a bearing gap through relative rotation of a bearing sleeve and a shaft member inserted into an inner periphery of the bearing sleeve, and which supports the shaft member in a non-contact manner with this pressure. The fluid dynamic bearing device is roughly classified into one which includes a dynamic pressure generating portion which positively generates a bearing action to the lubricating fluid at a bearing gap, and other one which does not include such a dynamic pressure generating portion, and in which both the inner peripheral surface of the bearing sleeve and the outer peripheral surface of the shaft member are formed into a cylindrical surface, i.e., "cylindrical bearing."

The fluid dynamic pressure bearing device is endowed with various features such as high speed rotation, high rotational precision, and low noise, and is widely used, by utilizing its features in recent years, as a bearing device for use in a spindle motor mounted to an information apparatus, for example, a magnetic disk device such as an HDD and an FDD, an optical disk device such as a CD-ROM, a CD-R/RW, or a DVD-ROM/RAM, or a magneto-optical disk device such as an MD or an MO, a polygon scanner motor mounted to a laser beam printer (LBP), etc., a fan motor mounted to a personal computer (PC), etc., or a small motor mounted to electric equipment such as an axial fan.

In this kind of motor for information apparatus, along with increase of information processing amount, laminating of recording medium or attainment of high speed rotation is rapidly progressed. Along with this progress, further enhancement of the rigidity (moment rigidity), in particular, the rigidity with respect to moment load is required to the fluid dynamic bearing device.

As means for enhancing the moment rigidity of the fluid dynamic bearing device, it is generally employed a structure in which the radial bearing portions are formed at two portions in the axial direction while isolating therebetween, to thereby enlarge the bearing span. As this kind of structure, for example, there is known the following structures:

(1) a structure in which the radial bearing surfaces are formed at vertical two positions of a single bearing sleeve (for example, refer to Patent Document 1); and (2) a structure in which two bearing sleeves are arranged in the axial direction, and one each of the radial bearing surface is formed on both bearing sleeves (for example, refer to Patent Document 2).

Patent Document 1: JP 10-9250 A
Patent Document 2: JP 11-269475 A

DISCLOSURE OF THE INVENTION

Problem to be Solved by the Invention

However, in the structure (1), along with enlargement of the bearing span, the bearing sleeve upsizes. If the bearing sleeve upsizes, it becomes difficult to secure the processing precision of the bearing sleeve. In particular, in a case where the bearing sleeve is made of a sintered metal, there is a fear in that it becomes hard to obtain uniform density at the compact molding, and the bearing performance at an early stage can not be exerted. Thus, there is a limitation on further enlargement of the bearing span.

On the other hand, in a case where two bearing sleeves are used as in the above-mentioned structure (2), even if the individual radial bearing surface of the inner periphery of the bearing sleeve is formed at high precision, there is a fear of occurring deviation of the center when the respective bearing sleeves are fixed to the housing by means of bonding, press-fitting, or the like. In the case of bonding, for example, there is a fear in that positions of the bearing sleeves in the radial direction are not fixed, and the coaxiality of the two bearing sleeves is degraded, because of such a bonding gap (space to which adhesive is charged) between the outer peripheral surface of the bearing sleeve and the inner peripheral surface of the housing. Besides, in the case of press-fitting, the precision of the inner peripheral surface of the bearing sleeve follows the precision of the outer peripheral surface of the bearing sleeve or the precision of the inner peripheral surface of the housing, and hence depending on finishing precision of those surfaces, there is a fear of degradation of the coaxiality of the radial bearing surfaces. The degradation of the coaxiality may cause the degradation of the bearing performance, and further may cause a failure such as wear caused by the contact between the bearing sleeve and the shaft member. To prevent the above-mentioned failure, if the bearing gap is set to be wider, the pressure of the lubricating fluid charged into the gap is lowered, thereby being not able to obtain sufficient bearing rigidity.

Further, in the above-mentioned structure (2), upon assembling, as illustrated in FIG. 17, for example, there is a need to secure the coaxiality of, by inserting an assembly pin 70 into the inner periphery of the bearing sleeve, both the assembly pin 70 and the bearing sleeve. However, in this structure, to secure the bearing span, it is a general rule to provide both radial bearing surfaces 80a at end portions in a direction departing from the other side sleeve. In this case, there is formed a space 80b having a larger diameter than an outer diameter of the pin in the vicinity of a joint surface between the sleeves each other. Accordingly, depending on end face precision between the sleeves each other, as illustrated in FIG. 17, even if the two bearing sleeves 80, 80 are inclined state (midway (center) bent state), the pin 70 may be inserted thereinto. In this midway bent state, assembly precision thereafter degrades, and affects adversely on the bearing performance.

It is, therefore, an object of the present invention to provide a fluid dynamic bearing device having high moment rigidity while avoiding the degradation of assembly precision or the bearing performance.

Means for Solving the Problems

To solve the above-mentioned problems, a fluid dynamic bearing device according the present invention includes: bearing sleeves each having a radial bearing surface; a housing fixing the bearing sleeves; a shaft member inserted into an inner periphery of the bearing sleeves; and a radial bearing gap formed by being isolated in an axial direction between the radial bearing surface of the bearing sleeves and an outer peripheral surface of the shaft member, in which a plurality of the bearing sleeves are arranged in the axial direction, and, while the respective bearing sleeves are in fixed states to the housing, coaxiality of the radial bearing surfaces of the respective bearing sleeves is set to 3 μm or less.

As described above, according to the fluid dynamic bearing device of the present invention, the bearing sleeves each having a radial bearing surface are arranged in the axial direction, and hence the radial bearing gap between the radial bearing surface and the outer peripheral surface of the shaft member opposed thereto are formed at a plurality of portions which are isolated in the axial direction. With this structure, even in a case where an axial span (bearing span) between the adjacent radial bearing surfaces is increased, enlargement of dimensions of the respective bearing sleeves in the axial direction may be suppressed. Accordingly, it is possible to homogenize the respective bearing sleeves, to thereby enhance the bearing performance while attaining improvement of moment rigidity. For example, also in a case where the bearing sleeves are made of a sintered metal, it is possible to suppress fluctuation of a molding pressure at compact molding to obtain a uniform density, thereby enhancing the bearing performance.

Further, the coaxiality of the radial bearing surfaces is set to 3 μm or less, and hence width precision of the radial bearing gaps is secured. As a result, degradation in the bearing performance, and a failure such as wear etc. caused by contact between the shaft member and the bearing sleeves may be prevented. The coaxiality described herein refers to a state in which the respective bearing sleeves are fixed to the housing. Even if the coaxiality of the respective bearing sleeves are set to the above-mentioned preset value before fixing to the housing, there is a fear in that the coaxiality may deviate after the fixing to the housing from the above-mentioned reasons. However, according to the present invention, this type of fear may be eliminated, and high bearing performance may be obtained upon use of the bearing device.

The coaxiality described herein refers to, as defined in JIS B 0621-1984, a magnitude of deviation of an axis line from a reference axis line, which is to be on the same straight line with the reference axis line. The magnitude is represented by a diameter of the smallest cylinder among geometrical cylinders which include all the axis lines and have the same axis with the reference axis line. For example, evaluations of the coaxiality of the inner peripheral surfaces (only axis lines L1 and L2 of respective inner peripheral surfaces are illustrated) of two bearing sleeves are illustrated in FIGS. 18 and 19. In this case, the reference axis line is denoted as L2. The magnitude of the coaxiality is represented by a diameter Dc of the smallest cylinder Cmin among the geometrically correct cylinders which include the axis lines (line segment) L1 and L2, and have an axis that is the same direction with the axis line being the reference line L2. Accordingly, if the coaxiality can be represented by a value of the diameter Dc, for example, form deviation between both surfaces C1 and C2 including an inclined degree of the axis line L1 with respect to the axis line L2 (refer to FIG. 18), deviation of the axis line L1 in the radial direction with respect to the axis line L2 (refer to FIG. 19), or the like can be properly evaluated. Note that, in this case, evaluation is carried out for the coaxiality of an area R, which is sandwiched between an end surface on one end side of the bearing sleeve of one end side and an end surface on the other end side of the bearing sleeve of the other end side among the two bearing sleeves, specifically, the minimum area R in the axial direction, which includes all the plurality of the bearing sleeves.

Each of opposing end surfaces of the adjacent bearing sleeves may be arranged with a gap in the axial direction. In addition, those may be contacted with each other. Besides, a spacer may be arranged at the gap between the opposing end surfaces. Of those, it is preferred that the opposing end surfaces of the bearing sleeves be brought into contact with each other so that a lubricating fluid allows to come and go between the bearing sleeves.

Further, the dynamic pressure generating portion, which causes the lubricating fluid to generate a dynamic pressure action, may be provided to the fluid dynamic bearing device like this. In this case, if the dynamic pressure generating portions are formed in the axial direction at two portions which are isolated as much as possible, the moment rigidity may be efficiently enhanced. The dynamic pressure generating portions may be formed on the radial bearing surfaces of the inner periphery of the bearing sleeves, and also may be formed on the shaft member opposing to the outer peripheral surfaces of the radial bearing surfaces.

Further, to solve the above-mentioned problems, a fluid dynamic bearing device according to the present invention includes: a shaft member; and bearing sleeves each including a radial bearing surface on an inner peripheral surface of the bearing sleeves, and rotatably supporting the shaft member in a non-contact manner by a dynamic pressure action generated at a radial bearing gap between the radial bearing surface and an outer peripheral surface of the shaft member, in which a plurality of the bearing sleeves are arranged in an axial direction, at least one of the adjacent two bearing sleeves includes a first radial bearing surface and a second radial bearing surface that is located on another bearing sleeve side than the first radial bearing surface, a dynamic pressure generating portion is formed on the first radial bearing surface, and the second radial bearing surface is formed into a cylindrical shape.

In addition, to solve the above-mentioned problems, a fluid dynamic bearing device according to the present invention includes: a shaft member; and bearing sleeves each including a radial bearing surface on an inner peripheral surface of the bearing sleeves, and rotatably supporting the shaft member in a non-contact manner by a dynamic pressure action generated at a radial bearing gap between the radial bearing surface and an outer peripheral surface of the shaft member, in which a plurality of the bearing sleeves are arranged in an axial direction, at least one of the adjacent two bearing sleeves includes a first radial bearing surface and a second radial bearing surface that is located on another bearing sleeve side than the first radial bearing surface, a dynamic pressure generating portion is formed on the first radial bearing surface, and the second radial bearing surface has spiral inclined grooves formed thereon.

As described above structure, by arranging the plurality of the bearing sleeves each having a radial bearing surface in the axial direction, it is possible to form the plurality of the radial bearing surfaces while isolating with each other in the axial direction. Through enlargement of the bearing span, the moment rigidity may be enhanced. At this time, lengths in the axial direction of the respective bearing sleeves may be shorten, and hence the degradation of the processing precision of the bearing sleeves, which becomes a problem when two radial bearing surfaces are formed on an upsized and single bearing sleeve, may be prevented.

Further, the first radial bearing surface and the second radial bearing surface are formed at least one of the adjacent two bearing sleeves, even in a case where assembly pins are inserted into inner peripheries of the two bearing sleeves upon assembling, the assembly pins are supported by two radial bearing surfaces (the first radial bearing surface) of both ends in the axial direction of a sleeve assembly, and in addition, are supported by the second radial bearing surface therebetween. Thus, the bearing sleeves are supported by pins at least three or more portions in the axial direction, the two bearing sleeves are prevented from being bent in the midway thereof, and the assembling work may be proceeded while high coaxiality of the both bearing sleeves is secured.

In this case, the dynamic pressure generating portions may be formed not only on the first radial bearing surface but also on the second radial bearing surface. However, this enhances the bearing rigidity, but results in increases in torque. To cope with this, as described above, if the second radial bearing surface is formed into a cylindrical surface or inclined grooves are formed on the second radial bearing surface so that the dynamic pressure is not generated on the second radial bearing surface, the above-mentioned problems may be solved and the increases in torque may also be prevented.

By the way, in the fluid dynamic bearing device, to prevent the degradation of the bearing performance due to generation of air bubbles, it is frequently performed to circulate the fluid (for example, lubricating oil) within an interior of the bearing device. This fluid circulation may be realized by such, for example, the dynamic pressure generating portions of the first radial bearing surface are formed so as to be asymmetrical in the axial direction, and a pumping force towards one way in the axial direction is made larger than that towards another way in the axial direction to thereby thrust the fluid at the radial bearing gap towards the one way in the axial direction.

In order to circulate the fluid as described above, in a case where the dynamic pressure generating portions are made to have asymmetrical shapes in the axial direction, the span between the radial bearing surfaces becomes shorter by the lengths in the axial direction of the dynamic pressure generating portions upsizes on the one way side in the axial direction. Due to this, there is a fear of causing the degradation of the moment rigidity. In this case, in the fluid dynamic bearing device having a structure in which spiral inclined grooves are formed on the second radial bearing surface, the thrust force (pumping force) towards the one way in the axial direction by the inclined grooves is secured, thereby being capable of reducing an asymmetrical amount (unbalance amount) in the axial direction at the dynamic pressure generating portions on the first radial bearing surface. The span (bearing span) between the respective radial bearing surfaces in the axial direction may be enlarged for that reduction, thereby being capable of preventing the degradation of the moment rigidity.

The motor including the fluid dynamic bearing device having the above-mentioned structure, a stator coil, and a rotor magnet may be preferably used for a spindle motor or the like for multiple disk-mounting type in which recording media are stacked (for example, disk) which particularly requires high moment rigidity.

Further, to solve the above-mentioned problems, according to the present invention, a method of manufacturing a fluid dynamic bearing device including: bearing sleeves each having a radial bearing surface; a housing fixing the bearing sleeves; a shaft member inserted into an inner periphery of the bearing sleeves; and a radial bearing gap formed by being isolated in an axial direction between the radial bearing surface of the bearing sleeves and an outer peripheral surface of the shaft member, the method including: arranging a plurality of the bearing sleeve in an axial direction; and fixing the bearing sleeves to the housing while centering between the radial bearing surfaces is performed. With this, the coaxiality of the respective radial bearing surfaces of the plurality of the bearing sleeves may be set to 3 μm or less.

As a fixing method for the bearing sleeves to the housing, there may be employed press-fitting, gap bonding, press-fitting bonding, welding, or the like. The gap bonding is a method in which mating of the outer peripheral surface of the bearing sleeve and the inner peripheral surface of the housing is performed by gap mating, and adhesive is charged into the gap. The press-fitting bonding is a method in which the bearing sleeve is press-fitted into the inner periphery of the bearing sleeve under intermediation of the adhesive. In the structure in which the mating of the outer peripheral surface of the bearing sleeve and the inner peripheral surface of the housing is carried out by tight fitting like the press-fitting or the press-fitting bonding, there occurs a case where the shape of the radial bearing follows the shape of the outer peripheral surface of the surface bearing sleeve or the shape of the inner peripheral surface of the housing. Accordingly, the secure of the precision becomes difficult, and hence it is preferred that the outer peripheral surface of the bearing sleeve and the inner peripheral surface of the housing be gap-bonded.

Effects of the Invention

As described above, according to the present invention, it is possible to provide the fluid dynamic bearing device having high moment rigidity while preventing the degradation of the assembly precision and the degradation of the bearing performance.

BRIEF DESCRIPTION OF THE DRAWINGS

FIG. 3(*b*) is a bottom view of a second bearing sleeve.

FIG. 4(*b*) is a cross-sectional view illustrating the centering mechanism for the sleeve assembly.

FIG. 4(*c*) is across sectional view illustrating a state where centering is performed by the centering mechanism.

FIG. 5(*b*) is a cross sectional view illustrating the another centering mechanism for the sleeve assembly.

FIG. 5(*c*) is across sectional view illustrating a state where centering is performed by the another centering mechanism.

FIG. 6(*a*) is a vertical sectional view illustrating still another centering mechanism for the sleeve assembly.

FIG. 6(*b*) is a cross sectional view illustrating the still another centering mechanism for the sleeve assembly.

FIG. 6(*c*) is across sectional view illustrating a state where centering is performed the still another centering mechanism.

Figure 1:
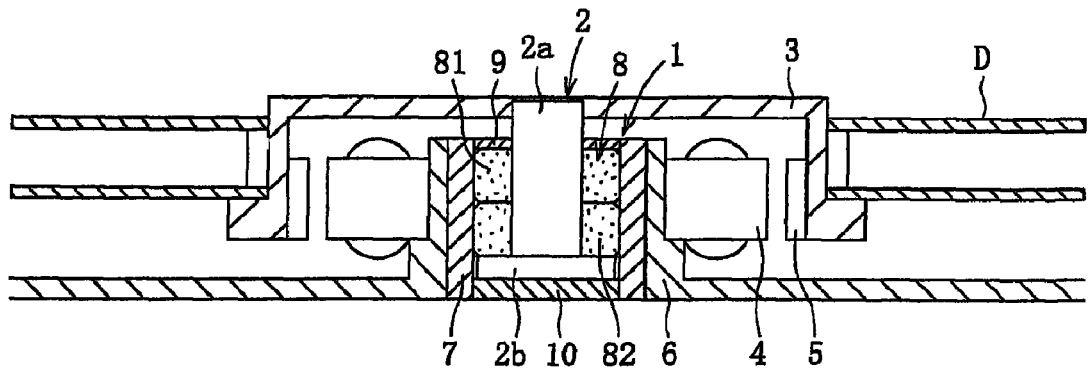
FIG. 1 is a sectional view of an information apparatus spindle motor in which a fluid dynamic bearing device is incorporated.

DESCRIPTION OF SYMBOLS 1 fluid dynamic bearing device
2 shaft member
3 disk hub
4 stator coil
5 rotor magnet
6 bracket
7 housing
8 sleeve assembly
81 first bearing sleeve
81a inner peripheral surface
81a1 dynamic pressure groove
81a2 back portion
81a3 smooth portion
82 second bearing sleeve
82a inner peripheral surface
82a1 dynamic pressure groove
82a2 back portion
82a3 smooth portion
9 seal member
10 lid member
A1, A2 (first) radial bearing surface
A1', A2' second radial bearing surface
B thrust bearing surface
C thrust bearing surface
L bearing span
R1, R2 radial bearing portion
T1, T2 thrust bearing portion
S seal space

BEST MODE FOR CARRYING OUT THE INVENTION

In the following, an embodiment of the present invention is described with reference to the drawings.

FIG. 1 is a diagram conceptually showing, as an example of a fluid dynamic bearing device according to the present invention, a structural example of a spindle motor for an information apparatus incorporating a fluid dynamic bearing device (i.e., fluid dynamic bearing device) 1. The spindle motor is used in a disk drive apparatus such as an HDD, and is equipped with the fluid dynamic bearing device 1 for rotatably supporting a shaft member 2 in a non-contact manner, a rotor (disk hub) 3 mounted to the shaft member 2 of the dynamic bearing device 1, and a stator coil 4 and a rotor magnet 5 opposed to each other through the intermediation of, for example, a gap in a radial direction. The stator coil 4 is mounted to, for example, an outer periphery of a bracket 6, and the rotor magnet 5 is mounted to an inner periphery of the disk hub 3. The housing 7 of the fluid dynamic bearing device 1 is mounted to an inner periphery of the bracket 6. A plurality of disks D such as magnetic disks are retained on the disk hub 3. When electricity is supplied to the stator coil 4, the rotor magnet 5 is rotated by an electromagnetic force generated between the stator coil 4 and the rotor magnet 5, and with this rotation, the disk hub 3 is rotated integrally with the shaft member 2.

Figure 2:
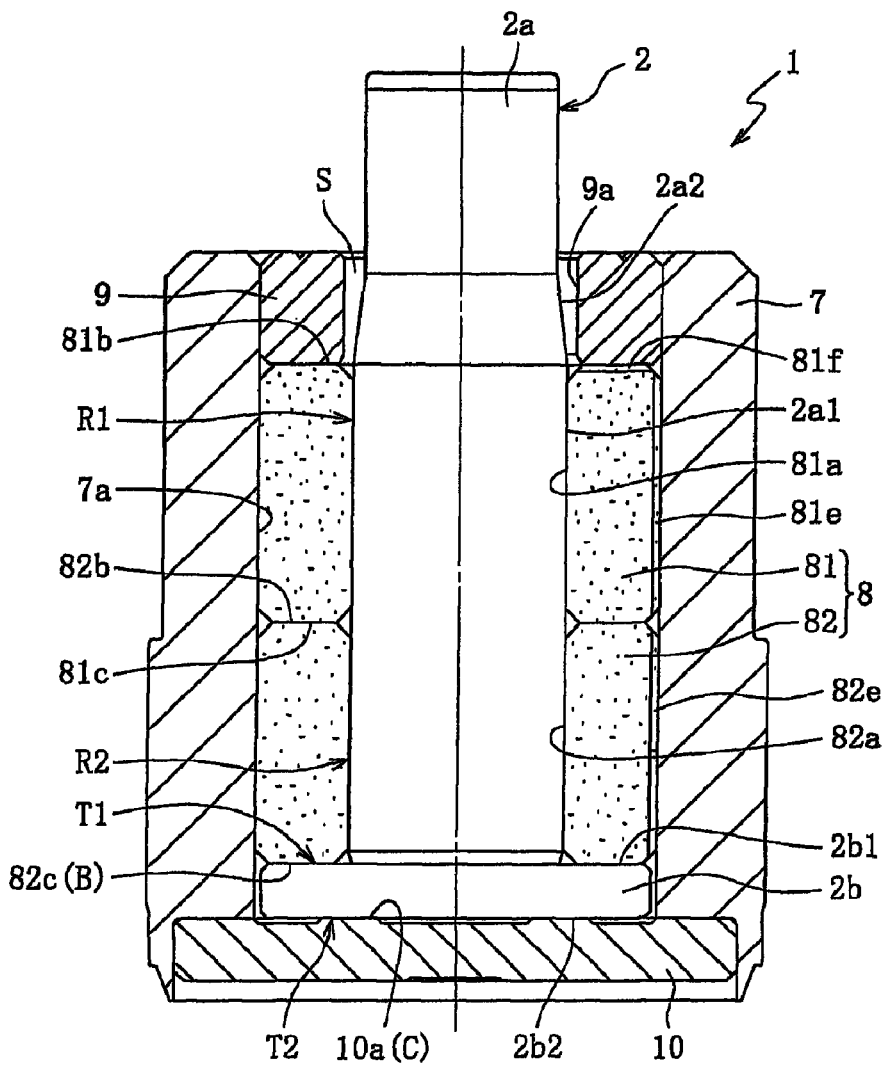
FIG. 2 is a sectional view of the fluid dynamic bearing device according to the present invention.

FIG. 2 illustrates an example of the fluid dynamic bearing device 1 for use in the spindle motor. The fluid dynamic bearing device 1 includes, as main components thereof, a housing 7, a sleeve assembly 8 fixed to an inner periphery of the housing 7, a shaft member 2 inserted into an inner periphery of the sleeve assembly 8, a seal member 9 for sealing one end opening of the housing 7, and a lid member 10 for sealing another end opening of the housing 7. The sleeve assembly 8 includes a plurality of bearing sleeves arranged in an axial direction. In this embodiment, a case of a structure including the two bearing sleeves (first bearing sleeve 81 and second bearing sleeve 82) allowed to abut on each other at end surfaces thereof is taken as an example. Note that, for the convenience of the description, the description is made with aside of the seal member 9 being an upper side, and an opposite end side in an axial direction thereof being a lower side.

In this embodiment, a first radial bearing portion R1 is provided between an inner peripheral surface 81a of the first bearing sleeve 81 and an outer peripheral surface 2a1 of a shaft portion 2a of the shaft member 2, and a second radial bearing portion R2 is provided between an inner peripheral surface 82a of the second bearing sleeve 82 and the outer peripheral surface 2a1 of the shaft portion 2a. Further, a first thrust bearing portion T1 is provided between a lower end surface 82c of the second bearing sleeve 82 and an upper end surface 2b1 of a flange portion 2b of the shaft member 2, and a second thrust bearing portion T2 is provided between an upper end surface 10a of a lid member 10 and a lower end surface 2b2 of the flange portion 2b.

The shaft member 2 has the shaft portion 2a and the flange portion 2b protruding radially outwardly from a lower end of the shaft portion 2a. The shaft member 2 may have a hybrid structure made of metal and a resin, in which an entire body is made of a metal material such as stainless steel, and for example, the shaft portion 2a is made of metal and the flange portion 2b is made of a resin. In this embodiment, the outer peripheral surface 2a1 of the shaft portion 2a is formed to be a smooth cylindrical surface having no dynamic pressure groove or the like, and both the end surfaces 2b1 and 2b2 of the flange portion 2b are formed to be smooth flat surfaces having no dynamic pressure groove or the like.

The housing 7 is formed into a cylindrical shape by injection molding a resin material, for example. An inner peripheral surface 7a thereof is a straight cylindrical surface having a constant diameter. An outer peripheral surface of the housing 7 is fixed to an inner peripheral surface of a bracket 6 illustrated in FIG. 1 by appropriate means such as press-fitting, adhesion, press-fitting adhesion, or the like.

As a resin material forming the housing 7, any resin material including an amorphous resin and a crystalline resin, capable of performing injection molding can be used, for example, it is possible to use: an amorphous resin such as polysulfone (PSU), polyether sulfone (PES), polyphenyl sulfone (PPSU), or polyetherimide (PEI); or a crystalline resin such as liquid crystal polymer (LCP), polyetherether ketone (PEEK), polybutylene terephthalate (PBT), or polyphenylene sulfide (PPS). As a matter of course, those are only part of examples, and other resin materials suitable for application or use environment of the bearing may also be used. One or more kinds of various fillers such as a reinforcing material (in different to modes such as fiber or powder), a lubricant, or a conductive material are mixed with the above-mentioned resin material.

Except those, the housing 7 may be formed of the soft metal material such as brass or an aluminum alloy or other metal materials.

An annular seal member 9 formed of a metal material or a resin material is fixed to an inner periphery of an opening portion at an upper end of the housing 7 by, for example, press-fitting, adhesion, or a combination thereof. An inner peripheral surface 9a of the seal member 9 is opposed to a tapered surface 2a2 provided to the outer peripheral surface 2a1 of the shaft portion 2a through intermediation of a seal space S. The tapered surface 2a2 of the shaft portion 2a is gradually reduced in diameter toward an upper side, and functions as a centrifugal force seal owing to rotation of the shaft member 2. After assembly of the fluid dynamic bearing device, an inner space of the fluid dynamic bearing device 1 hermetically sealed by the seal member is filled with, for example, a lubricating oil as a lubricating fluid. In this state, an oil surface of the lubricating oil is retained within a range of the seal space S. Note that, in order to reduce the number of parts and assembling processes, the seal member 9 may be integrally formed with the housing 7. Further, by forming the outer peripheral surface 2a1 of the shaft member 2 in a straight shape and the inner peripheral surface 9a of the seal member 9 in a tapered shape, the seal space S can be formed.

An opening portion at a lower end of the housing 7 is sealed by the lid member 10 provided separately from the housing 7. The lid member 10 is formed of a metal material or a resin material in a disk shape, and is fixed in position by press-fitting, adhesion, or a combination thereof. In a partial annular region of the upper end surface 10a of the lid member 10, a thrust bearing surface C of the second thrust bearing portion T2 is formed. On the thrust bearing surface C, dynamic pressure grooves aligned, for example, in a spiral manner are formed (not shown).

Each of the first and second bearing sleeves 81 and 82 constituting the sleeve assembly 8 is formed of a porous body made of sintered metal particularly containing copper as a main component thereof and is formed into a cylindrical shape. Both the bearing sleeves 81 and 82 are formed to have the same axial length. Note that, one or both of the first and second bearing sleeves 81 and 82 may be formed of soft metal such as brass. In this embodiment, the two bearing sleeves 81 and 82 are fixed to the inner peripheral surface of the housing 7 in a state where the end surfaces of those are brought into contact with each other. By adhering the end surfaces to each other, a lubricating oil can move back and forth between the two bearing sleeves 81 and 82, thereby making it possible to allow the lubricating oil to more dynamically flow in the bearing device. As a method of fixing the bearing sleeves 81 and 82 to the housing 7, for example, gap bonding is employed. When width of the bonding gap is too large, adhesion with a sufficient strength becomes difficult. Accordingly, it is preferable that a maximum gap width be set 100 μm or smaller, desirably 50 μm or smaller, and more desirably 20 μm or smaller.

Figure 3A:
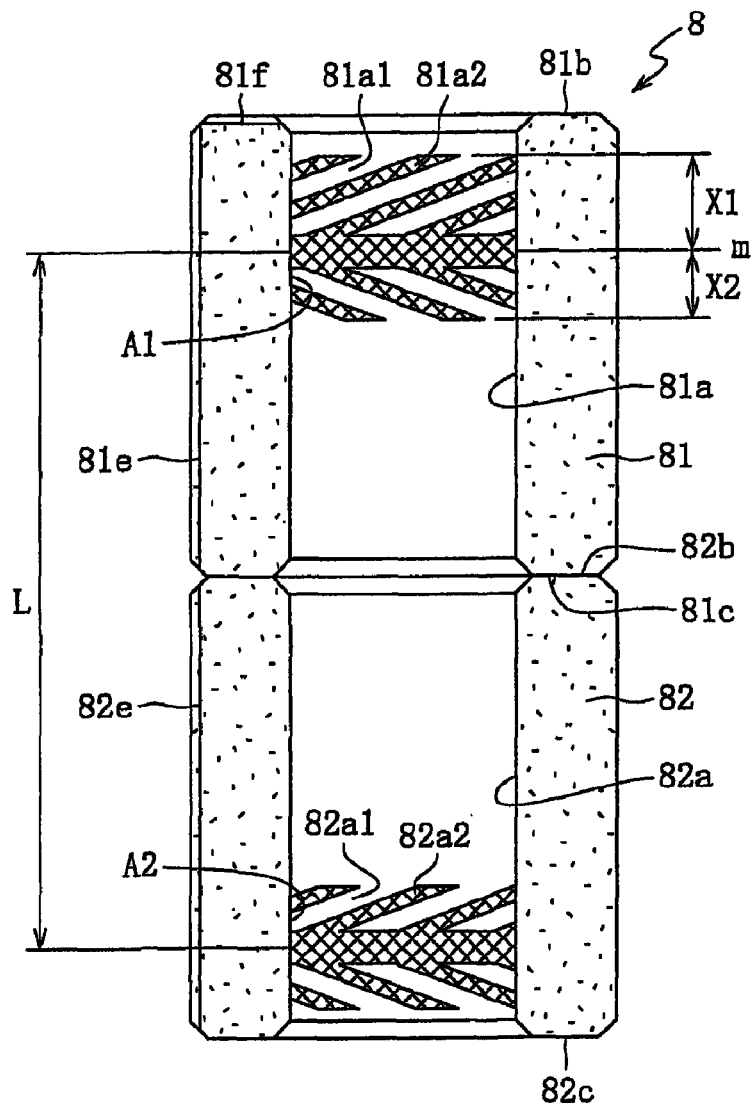
FIG. 3(*a*) is a sectional view of a sleeve assembly.

On an upper end of the inner peripheral surface 81a of the first bearing sleeve 81, a radial bearing surface A1 of the first radial bearing portion R1 is provided. On the radial bearing surface A1, as illustrated in FIG. 3(a), there are provided dynamic pressure grooves 81a1 of a herringbone shape and a back portion 81a2 of a protruding shape, for partitioning the dynamic pressure grooves 81a1. Further, on a lower end, of the inner peripheral surface 82a of the second bearing sleeve 82, the radial bearing surface A2 of the second radial bearing portion R2 is provided. On the radial bearing surface A2, there are formed dynamic pressure grooves 82a1 of a herringbone shape and a back portion 82a2 of a protruding shape, which are vertically symmetrical with respect to an axial center, for partitioning the dynamic pressure grooves 82a1. In any of the bearing sleeves 81 and 82, in the region except the radial bearing surfaces A1 and A2, the inner diameter dimension thereof is set equal to or larger than that in the dynamic pressure grooves 81a1 and 82a1 of both the radial bearing surfaces.

The dynamic pressure grooves 81a1 of the first bearing sleeve 81 are formed asymmetrically in an axial direction with respect to an axial center m (axial center in the region of vertically inclined grooves), with an axial dimension X1 of the region on the upper side with respect to the axial center m being larger than an axial dimension X2 of the region on the lower side with respect thereto. Thus, during rotation of the shaft, member 2, the lubricating oil drawing force (pumping force) due to the dynamic pressure grooves 81a1 of the first bearing sleeve 81 is relatively larger than that of the dynamic pressure grooves 82a1 of the second bearing sleeve 82 of a symmetrical shape. Note that, the dynamic pressure grooves 81a1 and 82a1 may be formed into another publicly known shape, for example, in a spiral shape. Further, the respective radial bearing surfaces A1 and A2 of the first and second bearing sleeves 81 and 82 may be formed into a complete circular shape having no dynamic pressure grooves, and the similar dynamic pressure grooves may be formed into an axial outer surface 2a1 of the shaft member 2, which is opposed thereto.

Figure 3B:
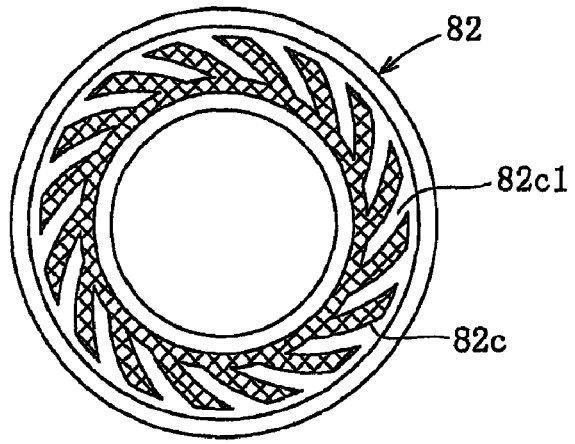

In a partial annular region of the lower end surface 82c of the second bearing sleeve 82, a thrust bearing surface B of the first thrust bearing portion T1 is formed. On the thrust bearing surface B, as illustrated in FIG. 3(b), the dynamic pressure grooves 82c1 of a spiral shape is formed. The dynamic pressure grooves may be formed into another publicly known shape, for example, in a herringbone shape.

On the outer peripheral surfaces of the first and second bearing sleeves 81 and 82, one or a plurality of axial circulation groove(s) 81e and 82e are formed. Further, on the upper end surface 81b of the first bearing sleeve 81, a circulation groove 81f is formed into a radial direction.

The inner peripheral surface 81a of the first bearing sleeve 81, which has the structure described above, can be formed, for example, by inserting a sizing pin into the inner peripheral surface 81a of the first bearing sleeve 81 and putting the first bearing sleeve 81 as it is in a die so as to perform compression molding (sizing) thereon, the sizing pin having on the outer periphery thereof a molding portion corresponding to a shape of the inner peripheral surface 81a. By compression molding, the inner peripheral surface 81a of the first bearing sleeve 81 causes plastic flow so as to adhere to the molding portion of the sizing pin, so the surface shape of the molding portion is transferred to the inner peripheral surface 81a of the bearing sleeve. As a result, it is possible to mold the radial bearing surface A1 with high accuracy on the inner peripheral surface 81a of the first bearing sleeve 81. When the first bearing sleeve 81 is taken out of the die for compression molding, spring back is caused in the bearing sleeve 81, so the molded inner peripheral surface 81a is increased in diameter. Thus, without breaking the molded inner peripheral surface 81a, it is possible to smoothly remove the sizing pin from the inner periphery of the bearing sleeve 81. The radial bearing surface A1 can be formed by the method except the compression molding, for example, by inkjet printing. Note that, the molding method for the radial bearing surface A2 on the inner peripheral surface 82a of the second bearing sleeve 82 is accorded to that for the first bearing sleeve 81, so the redundant description thereof is omitted.

In the fluid dynamic bearing device 1 having the structure described above, when the shaft member 2 is rotated, each of the radial bearing surface A1 of the inner peripheral surface 81a of the first bearing sleeve 81 and the radial bearing surface A2 of the inner peripheral surface 82a of the second bearing sleeve 82 is opposed to the outer peripheral surface 2a1 of the shaft member 2 through the intermediation of a radial bearing gap. Further, in accordance with the rotation of the shaft member 2, the pressure of the lubricating oil filled in the radial bearing gap is increased by the dynamic pressure action of the dynamic pressure grooves of the first and second radial bearing portions R1 and R2, so the shaft member 2 is rotatably supported in a non-contact manner in a radial direction.

Further, when the shaft member 2 is rotated, the region to be the thrust bearing surface B on the lower end surface 82c of the second bearing sleeve 82 is opposed to the upper end surface 2b1 of the flange portion 2b through the intermediation of a predetermined thrust bearing gap, and the region to be the thrust bearing surface C on the upper end surface 10a of the lid member 10 is opposed to the lower end surface 2b2 of the flange portion 2b through the intermediation of a predetermined thrust bearing gap. Further, in accordance with the rotation of the shaft member 2, the pressure of the lubricating oil filled in each of the thrust bearing gaps is increased by the dynamic pressure action of the dynamic pressure grooves of the first and second thrust bearing portions T1 and T2, so the shaft member 2 is rotatably supported in a non-contact manner in both the thrust directions.

Further, during the rotation of the shaft member 2, owing to the difference in pumping force between the upper and lower sides of the dynamic pressure grooves 81a1 of the radial bearing surface A1 on the upper side, the lubricating oil flows downward in a gap between the respective inner peripheral surfaces 81a and 82a of the bearing sleeves 81 and 82 and the outer peripheral surface 2a1 of the shaft member 2. The lubricating oil pumped downward is returned into the radial bearing gap of the first radial bearing portion after sequentially flowing in the following: the thrust bearing gap of the first thrust bearing portion T1, the circulation grooves 82e and 81e in an axial direction, and the circulation groove 81f in a radial direction. As described above, by circulation of the lubricating oil in the bearing device, it is possible to prevent the generation of local negative pressure in the lubricating oil to avoid generation of bubbles in accordance therewith. Note that, the circulation grooves 82e and 81e in an axial direction and the circulation groove 81f in a radial direction may be formed on the inner peripheral surface of the housing 7 or at the lower end surface of the seal member 9.

The circulation described above of the lubricating oil in the bearing may be performed in the inverse direction by adjustment of the length of dynamic pressure grooves of the radial bearing surfaces A1 and A2 and the like. Further, in the case where it is not necessary in particular to forcedly circulate the lubricating oil, the dynamic pressure grooves of both the radial bearing surfaces A1 and A2 may be formed symmetrically in a vertical direction with respect to respective axial centers.

The fluid dynamic bearing device 1 having the structure described above is assembled by, for example, fixing the two bearing sleeves 81 and 82 and the seal member 9 along the inner periphery of the housing 7 before inserting the shaft member 2 along the inner periphery of the bearing sleeves 81 and 82, and then sealing the opening portion at the lower end of the housing 7 with the lid member 10. After that, by the supply of the lubricating oil to an inner space of the housing 7, the fluid dynamic bearing device 1 illustrated in FIG. 1 is completed.

In this assembling process, when the two bearing sleeves 81 and 82 are fixed along the inner periphery of the housing 7, the respective bearing sleeves 81 and 82 are inserted along the inner periphery of the housing 7 while the centering between the radial bearing surfaces A1 and A2 is performed, and then fixed by gap-filling adhesion.

Figure 4B:
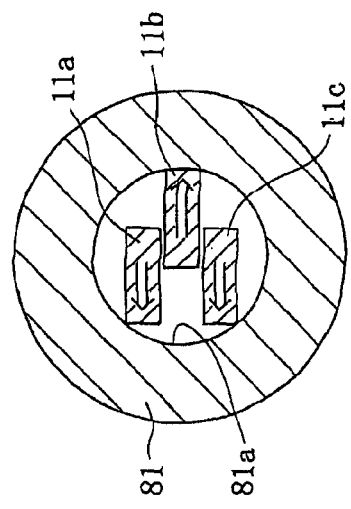
FIG. 4(*a*) is a vertical sectional view illustrating a centering mechanism for the sleeve assembly.
Figure 4C:
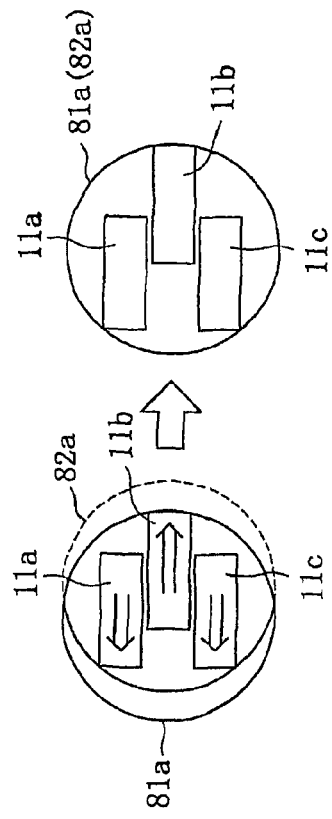
Figure 4A:
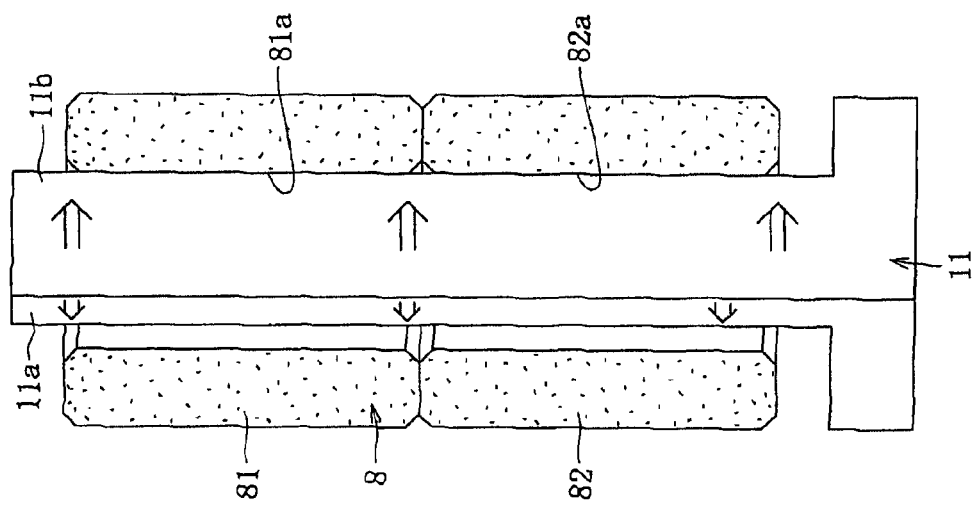

This centering operation can be performed, for example, by using the centering mechanism illustrated in FIGS. 4(a) to (c). The centering mechanism includes a plurality of (three, for example) jigs 11a to 11c of a rectangular column shape which are slidable independently of one another in a direction orthogonal to the center axis. After inserted along the inner periphery of the bearing sleeves 81 and 82, the jigs 11a to 11c are slid in a radial direction to be pressed to fit three portions in a circumferential direction of the respective inner peripheral surfaces 81a and 82a (back portions 81a2 and 82a2 of the dynamic pressure grooves on the radial bearing surfaces A1 and A2, in particular) of the bearing sleeves 81 and 82 so that the outer contact diameter is increased. As a result, forces by which the diameter is increased are exerted at the three portions in the circumferential direction, so centering between both the bearing sleeves 81 and 82 is performed (refer to FIG. 4(c)). As described above, while the jigs 11a to 11c are pressed to fit the respective inner peripheral surfaces 81a and 82a of the bearing sleeves 81 and 82, the bearing sleeves 81 and 82 are inserted along the inner periphery of the housing 7, so the bearing sleeves 81 and 82 are fixed to the inner peripheral surface of the housing 7 by gap-filling adhesion. After the adhesive is cured, the jigs 11a to 11c are slid in a direction of reducing the outer contact diameter thereof, and after that, removed from the inner periphery of the bearing sleeves 81 and 82, whereby the assembly constituted by the housing 7 and the bearing sleeves 81 and 82 is completed.

With the above-mentioned process, it is possible to set the coaxiality between the radial bearing surfaces A1 and A2 of the assembly 3 μm or smaller. When necessary, the coaxiality between the radial bearing surfaces A1 and A2 of each of the manufactured assemblies is measured, and an assembly of a coaxiality of 3 μm or smaller is treated as a defective. The measurement of the coaxiality in this case is performed at the respective back portions 81a2 and 82a2 of the radial bearing surfaces A1 and A2. The measurement method therefor includes extracting a center axis of one bearing surface by using a roundness measuring apparatus, a circularity measurement apparatus, or the like, and measuring a misalignment with respect to a center axis of the other bearing surface with reference to the center axis thus extracted.

As illustrated above, in the present invention, the plurality of bearing sleeves 81 and 82 are arranged in an axial direction, so it is possible to increase an axial span between the radial bearing surfaces A1 and A2 (bearing span L, refer to FIG. 3(a)), whereby high moment rigidity can be obtained. Meanwhile, each of the bearing sleeves 81 and 82 can avoid upsizing, so the variation in density does not occur even upon powder molding of the bearing sleeve made of sintered metal, whereby it is possible to stably circulate the lubricating oil between the inside and outside of the bearing sleeve.

Further, those plurality of bearing sleeves 81 and 82 are fixed to the housing 7 while subjected to centering so as to have a coaxiality of 3 μm or smaller, so it is possible to increase the bearing performance by equalizing the width of the radial bearing gap, and is possible to suppress abrasion between the bearing sleeves 81 and 82 and the shaft member 2 by avoiding contact therebetween.

The present invention is not limited to the above-mentioned embodiment. In the following, with reference to FIGS. 5 and 6, other examples of the centering mechanism for the sleeve assembly 8 are illustrated.

Figure 5B:
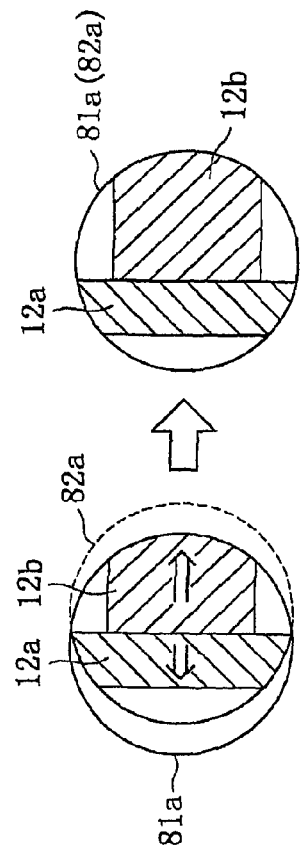
FIG. 5(*a*) is a vertical sectional view illustrating another centering mechanism for the sleeve assembly.
Figure 5C:
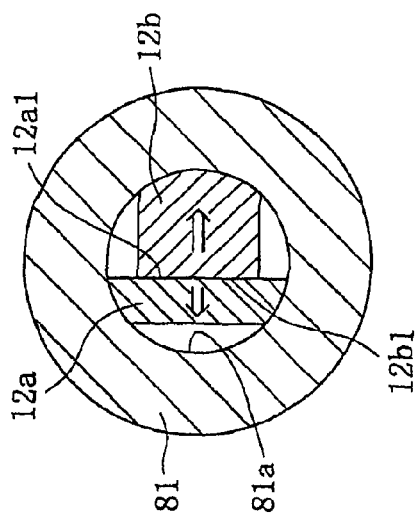
Figure 5A:
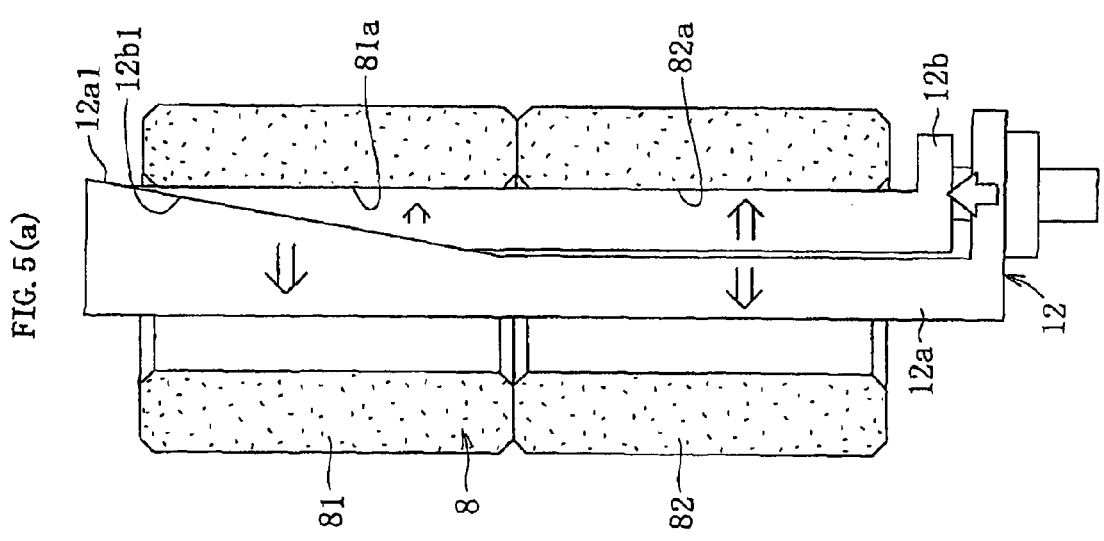

Of those, the centering mechanism illustrated in FIGS. 5(a) to (c) performs centering by relative sliding of two jigs 12a and 12b in an axial direction. Of both the jigs 12a and 12b, opposed two surfaces of one jig 12a and one surface of the other jig 12b are formed into a partially cylindrical surface shape having a curvature radius slightly smaller than a curvature radius of the respective inner peripheral surfaces 81a and 82a of the bearing sleeves 81 and 82. Respective tapered surfaces 12a1 and 12a2 provided to both the jigs 12a and 12b are in surface contact with each other. In the centering mechanism, by sliding any one of the jigs in an axial direction such that the tapered surfaces 12a1 and 12a2 are brought into press contact (in the drawing, by moving upward the jig 12b), the outer contact diameters of both the jigs 12a and 12b can be increased. As a result, the jigs 12a and 12b can be brought into contact at three points with the respective inner peripheral surfaces 81a and 82a of the bearing sleeves 81 and 82 (back portions 81a2 and 82a2 of the dynamic pressure grooves of the radial bearing surfaces A1 and A2, in particular). Thus, similarly to the centering mechanism illustrated in FIG. 4, it is possible to perform centering between the two bearing sleeves 81 and 82 (refer to FIG. 5(c)). Note that, while in this embodiment, two contact points with respect to the inner peripheral surfaces of the bearing sleeves are provided to one jig 12a, the similar jig 12a can be used in the centering mechanism illustrated in FIG. 4, thereby reducing the number of jigs to be used.

In the centering mechanism illustrated in FIGS. 6(a) to (c), a hollow cylindrical body is used as a jig 13, which may be increased and decreased in diameter owing to the fluid pressure. With increase in outer peripheral surface of the jig 13 by the supply of a fluid such as an oil to an inner space 13a of the jig 13, the outer peripheral surface of the jig 13 is pressed to fit the respective inner peripheral surfaces 81a and 82a of the bearing sleeves 81 and 82 (back portions 81a2 and 82a2 of the dynamic pressure grooves of the radial bearing surfaces A1 and A2, in particular) as a whole, whereby centering between the two bearing sleeves 81 and 82 is performed (refer to FIG. 6(c)).

In the following, with reference to FIG. 7, another structural example of the sleeve assembly 8 is illustrated.

Figure 7:
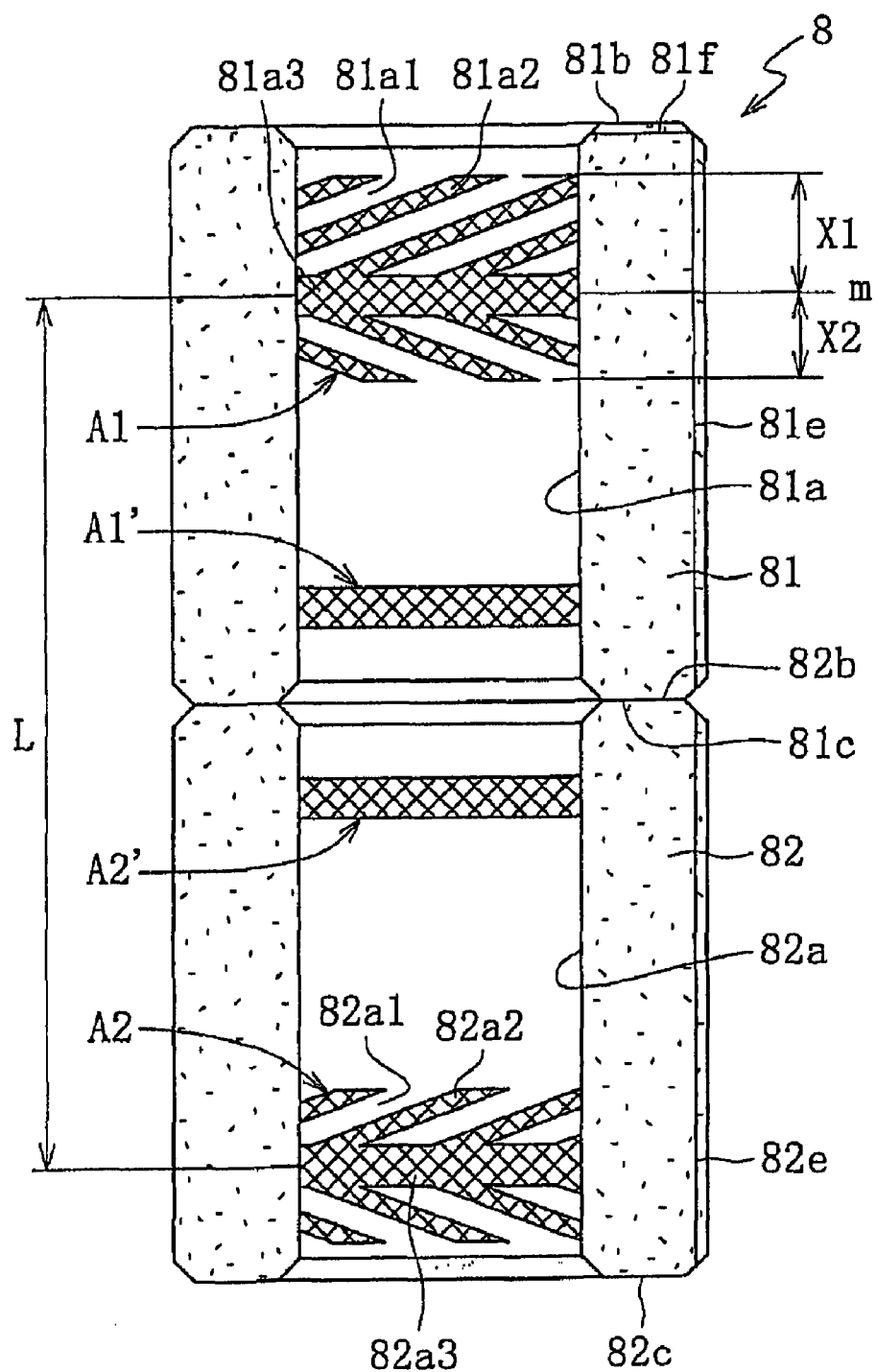
FIG. 7 is a view illustrating another structure of the sleeve assembly.

The first and second bearing sleeves 81 and 82 which constitute the sleeve assembly 8 illustrated in FIG. 7 are different from the above-mentioned embodiment in the structure of the inner peripheral surfaces 81a and 82a thereof. On the inner peripheral surface 81a of the first bearing sleeve 81, the first radial bearing surface A1 and a second radial bearing surface A1' are formed apart from each other in an axial direction, which form, with the aid of the outer peripheral surface 2a1 of the shaft member 2, a radial bearing gap therebetween. The first radial bearing surface A1 is formed at an end portion on the side (upper side) apart from the counterpart bearing sleeve (second bearing sleeve) 82, and the second radial bearing surface A1' is formed at an end portion on the other side. On the first radial bearing surface A1, for example, there are formed dynamic pressure grooves 81a1 of a herringbone shape as dynamic pressure generating portions. The back portion 81a2 between the dynamic pressure grooves and a smooth portion 81a3 of a complete round shape and continuous in a circumferential direction are equal to each other in inner diameter dimension. The second radial bearing surface A1' is formed into a smooth cylindrical surface protruding toward the inner diameter of the inner peripheral surface 81a, and is equal in inner diameter dimension to the back portion 81a2 and the smooth portion 81a3 on the first radial bearing surface A1. Further, the width in an axial direction of the second radial bearing surface A1' is smaller than that of the first radial bearing surface A1.

In the sleeve assembly 8, on the inner peripheral surface 82a of the second bearing sleeve 82 positioned on the lower side, the first radial bearing surface A2 and a second radial bearing surface A2' are similarly formed apart from each other in an axial direction. The first radial bearing surface A2 is formed at an end portion on the side (lower side) apart from the counterpart bearing sleeve (first bearing sleeve) 81, and similarly to the first radial bearing surface A1, has dynamic pressure grooves 82a1 of a herringbone shape as dynamic pressure generating portions, a back portion 82a2, and a smooth portion 82a3. The second radial bearing surface A2' is formed at an end portion on the opposite side in an axial direction, and similarly to the second radial bearing surface A1', is formed into a smooth cylindrical surface protruding toward the inner diameter. The second radial bearing surface A2' is equal in inner diameter dimension to the back portion 82a2 and the smooth portion 82a3 of the first radial bearing surface A2, and the width in an axial direction of the second radial bearing surface A2' is smaller than that of the first radial bearing surface A2.

Of the first radial bearing surfaces formed on the two bearing sleeves 81 and 82, the dynamic pressure grooves 81a1 on the first radial bearing surface A1 of the first bearing sleeve 81 are formed asymmetrically with respect to an axial center m (axial center in the region of vertically inclined grooves) in an axial direction, with an axial dimension X1 of the region on the upper side with respect to the axial center m being larger than an axial dimension X2 of the region on the lower side with respect thereto. Thus, during rotation of the shaft member 2, the lubricating oil drawing force (pumping force) due to the dynamic pressure grooves 81a1 is larger in a downward direction than in an upward direction. Meanwhile, the dynamic pressure grooves 82a1 on the first radial bearing surface A2 of the second bearing sleeve 82 are formed symmetrically with each other in an axial direction, so difference cannot be found in pumping force between a downward direction and an upward direction. Accordingly, the lubricating oil flows downward in a gap between the respective inner peripheral surfaces 81a and 82a of the bearing sleeves 81 and 82 and the outer peripheral surface 2a1 of the shaft member 2. Note that, the dynamic pressure grooves 81a1 and 82a1 may be formed into another publicly known shape, for example, in a spiral shape.

The fluid dynamic bearing device 1 including the sleeve assembly 8 having the above-mentioned structure is assembled as follows, for example.

Figure 8:
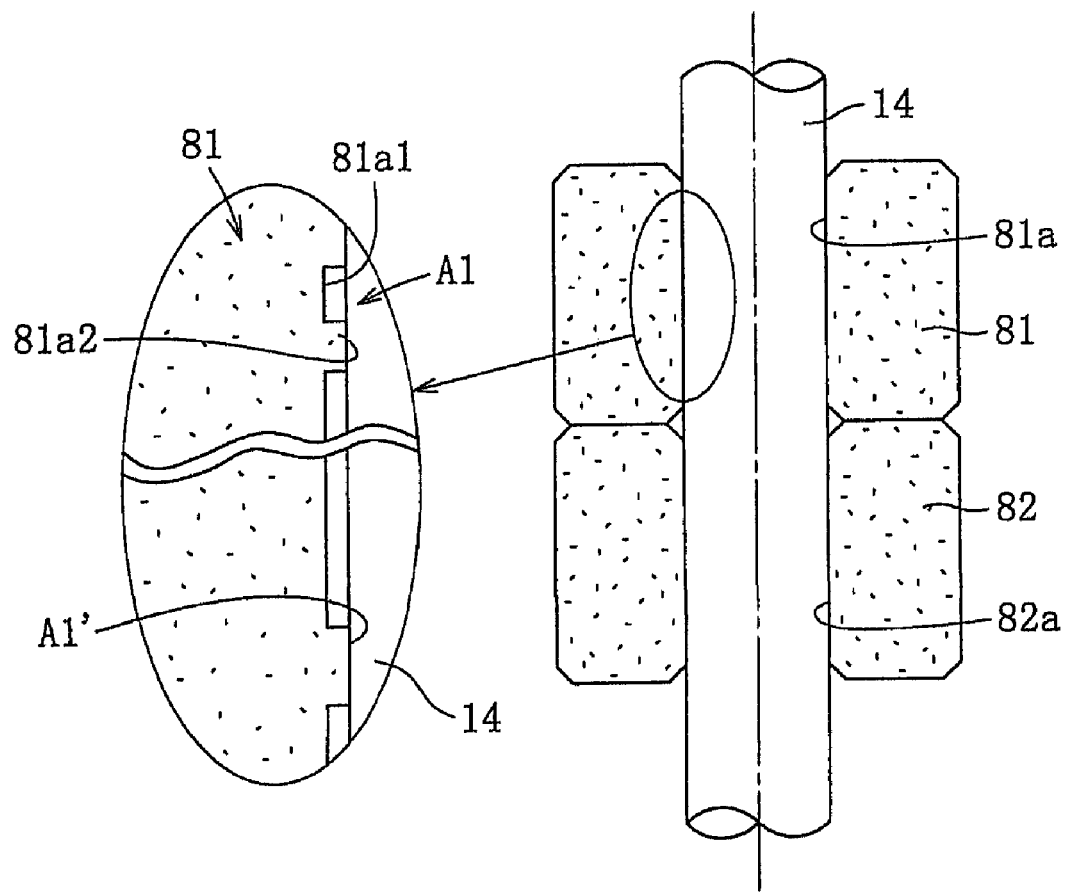
FIG. 8 is a schematic view illustrating an assembling process for the sleeve assembly.

As illustrated in FIG. 8, the first and second bearing sleeves 81 and 82 are coaxially arranged while in intimate contact with each other in an axial direction, and an assembly pin 14 of the same diameter in an axial direction is inserted along the inner peripheries thereof. In this state, between the outer peripheral surface of the assembly pin 14 and the protruding portions (respective back portions 81a2 and 82a2 of first radial bearing surfaces A1 and A2, smooth portions 81a3 and 82a3, and second radial bearing surfaces A1' and A2') on the respective inner peripheral surfaces 81a and 82a of the bearing sleeves 81 and 82, there exists a mating gap, in which the assembly pin 14 is freely movable and backlash is not allowed to cause between the pin 14 and the bearing sleeves 81 and 82. Next, the assembly thus obtained is inserted along the inner periphery of the housing 7, and the outer peripheral surface of each of the bearing sleeves 81 and 82 is fixed at a predetermined position on the inner peripheral surface of the housing 7 (not shown) by appropriate means such as adhesion, press-fitting, or welding (ultrasonic welding). Next, the assembly pin 14 is removed to insert the shaft member 2 along the respective inner peripheral surfaces 81a and 82a of the bearing sleeves 81 and 82, and further, the seal member 9 and the lid member 10 are fixed to both the opening portions at the ends of the housing 7 by the above-mentioned fixing means. After that, the lubricating oil is supplied so as to fill therewith the inner space of the bearing device including the radial bearing gap and the thrust bearing gap as a whole, thereby completing the fluid dynamic bearing device 1.

In the fluid dynamic bearing device 1 having the above-mentioned structure, when the shaft member 2 is rotated, each of the first and second radial bearing surfaces A1 and A1' on the inner peripheral surface 81a of the first bearing sleeve 81 is opposed to the outer peripheral surface 2a1 of the shaft member 2 through the intermediation of the radial bearing gap. On the first radial bearing surface A1, the pressure of the lubricating oil filled in the radial bearing gap is increased by the dynamic pressure action of the dynamic pressure grooves 81a1, and with the pressure, the shaft member 2 is rotatably supported in a non-contact manner in a radial direction. Meanwhile, on the second radial bearing surface A1', an oil film is formed by the oil seeping into the radial bearing gap, and the shaft member 2 is rotatably supported in a radial direction with the oil film. As a result, a first radial bearing portion R1 is structured in which the shaft member 2 is rotatably supported in a radial direction with the dynamic bearing and the complete round bearing. Similarly, even in the second bearing sleeve 81, the dynamic bearing and the complete round bearing are structured with the first and second radial bearing surface A2 and A2', whereby a second radial bearing portion R2 is structured in which the shaft member 2 is rotatably supported in a radial direction.

In accordance with rotation of the shaft member 2, the lubricating oil filled in the bearing device 1 is pumped by the pumping force generated on the first radial bearing surface A1 of an asymmetrical shape of the first bearing sleeve 81, and circulates the inner space. In order to form the circulation path of the lubricating oil, on the outer peripheral surfaces of the first and second bearing sleeves 81 and 82, the respective axial grooves 81e and 82e are formed, and on the upper end surface 81b of the first bearing sleeve 81, the radial groove 81f is formed. In this embodiment, the lubricating oil circulates the path starting from and returned to the gap between the inner peripheral surface 81a of the first bearing sleeve 81 and the outer peripheral surface 2a1 of the shaft member 2 while sequentially flowing in the following: the gap between the inner peripheral surface 82a of the second bearing sleeve 82 and the outer peripheral surface 2a1 of the shaft member 2, the thrust bearing gap of the first thrust bearing portion T1, the flow path (axial groove 82e) between the outer peripheral surface of the second bearing sleeve 82 and the inner peripheral surface of the housing 7, the flow path (axial groove 81e) between the outer peripheral surface of the first bearing sleeve 81 and the inner peripheral surface of the housing 7, and the flow path (radial groove 81f) between the upper end surface 81b of the first bearing sleeve 81 and the lower end surface of the seal member 9. By the circulation, it is possible to suppress generation of bubbles at high-pressure portion in the lubricating oil and to immediately discharge the generated bubbles to the air via the seal space S, thereby stabilizing the bearing function. Note that, even when the axial grooves 81e and 82e are formed on the inner peripheral surface of the housing 7 and the radial groove 81f is formed on the lower end surface, the same effect can be obtained.

Figure 17:
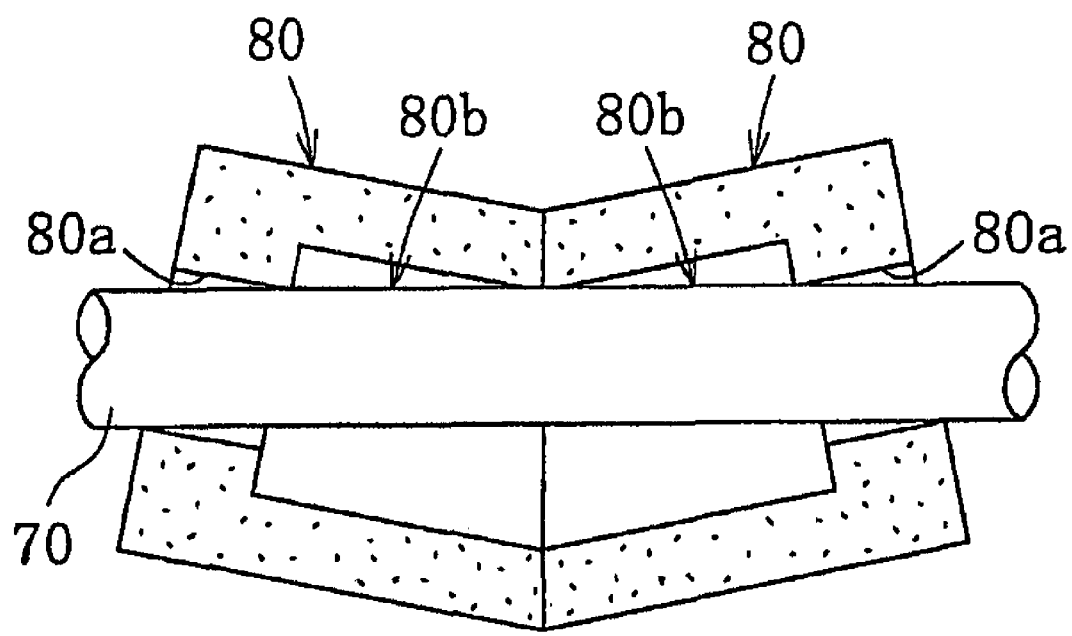
FIG. 17 is a schematic view illustrating an assembling process for a conventional structure.
Figure 18:
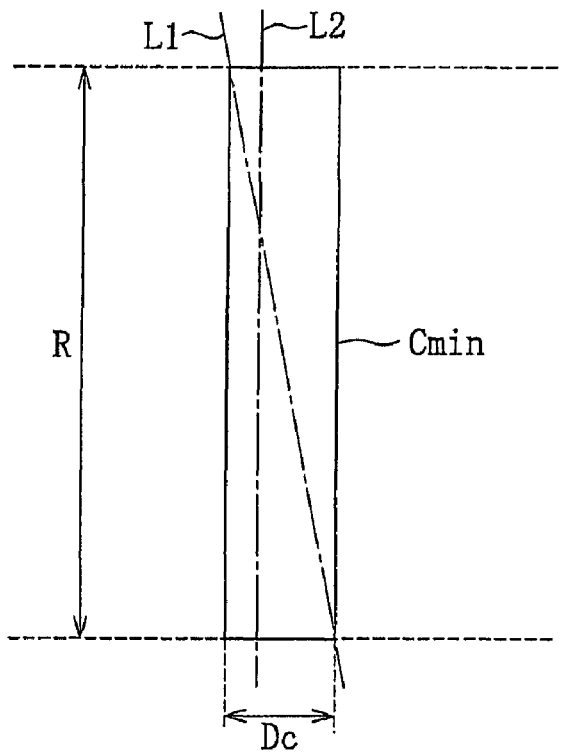
FIG. 18 is a diagram for visually illustrating a concept of coaxiality according to the present invention.
Figure 19:
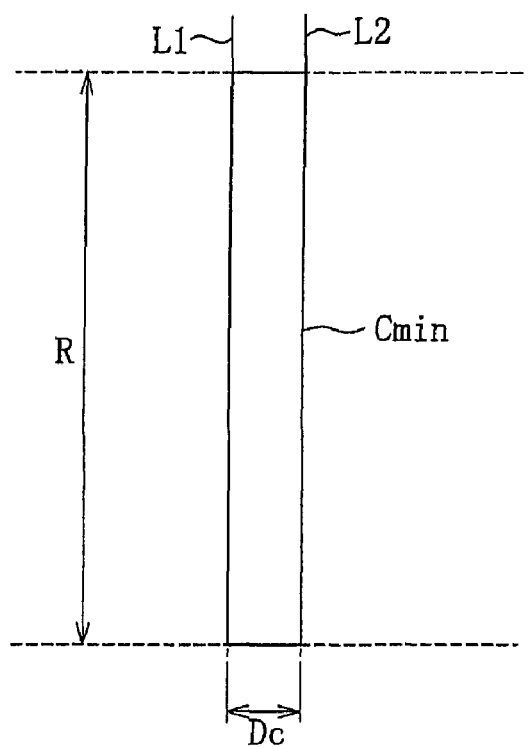
FIG. 19 is a diagram for visually illustrating a concept of coaxiality according to the present invention.

With the structure illustrated above, the bearing sleeves 81 and 82 are arranged in an axial direction, so it is possible to increase the axial span L between the radial bearing surfaces A1 and A2. Meanwhile, each of the bearing sleeves 81 and 82 can avoid upsizing, so the variation in density does not occur even upon powder molding of the bearing sleeves, thereby stabilizing the bearing function. Further, since the second radial bearing surfaces A1' and A2' are provided between the first radial bearing surfaces A1 and A2, in the assembling process illustrated in FIG. 8, it is possible to form, between the outer peripheral surface of the assembly pin 14 and the second radial bearing surfaces A1' and A2', the mating gap of substantially the same size as that of the gap between the first radial bearing surfaces A1 and A2. In this case, owing to the contact between the second radial bearing surfaces A1' and A2' and the outer peripheral surface of the assembly pin 14, the posture of each of the bearing sleeves 81 and 82 is corrected even near the central portion in an axial direction of the sleeve assembly 8, so it is possible to reliably prevent the center breakage of the bearing sleeves as illustrated in FIG. 17, and to ensure high coaxiality between both the bearing sleeves 81 and 82. Further, assembly accuracy can be ensured also in the subsequent assembling process.

From the above description, according to the present invention, it is possible to provide the fluid dynamic bearing device 1 having high moment rigidity while avoiding decreases in assembly accuracy and in bearing performance.

Note that, in the above description, the second radial bearing surfaces A1' and A2' and the protruding portions on the first radial bearing surfaces A1 and A2 are equal to each other in inner diameter dimension. However, it is not necessary for those to have the same diameter. For example, in order to achieve further reduction in torque, it is also possible for the second radial bearing surfaces A1' and A2' to be larger in inner diameter dimension than the protruding portions on the first radial bearing surfaces. Further, when the second radial bearing surfaces A1' and A2' are smaller in inner diameter dimension than the protruding portions on the first radial bearing surfaces, upon fixation of the bearing sleeves 81 and 82 along the inner periphery of housing 7, the second radial bearing surfaces A1' and A2' serve as a guide, and the first radial bearing surfaces A1 and A2 are not brought into contact with the guide pins. Thus, it is possible to perform assembly without damaging the dynamic pressure generating portions provided on the first radial bearing surfaces. In this case, on the outer peripheral surface 2a1 of the shaft portion 2a, by making the portions opposed to the second radial bearing surfaces A1' and A2' smaller in diameter than the portions opposed to the first radial bearing surfaces A1 and A2, it is possible to reduce the loss torque.

Further, in the above description, the respective second radial bearing surfaces A1' and A2' are formed on both the first and second bearing sleeves 81 and 82, and the prevention of the center breakage during the assembly can be achieved also by the contact between the assembly pin 14 and the bearing sleeve only at one portion in the central portion in an axial direction of the sleeve assembly 8. Accordingly, the second radial bearing surface may be provided to any one of the bearing sleeves.

In the following, with reference to FIG. 9, still another structural example of the sleeve assembly 8 is illustrated.

Figure 9:
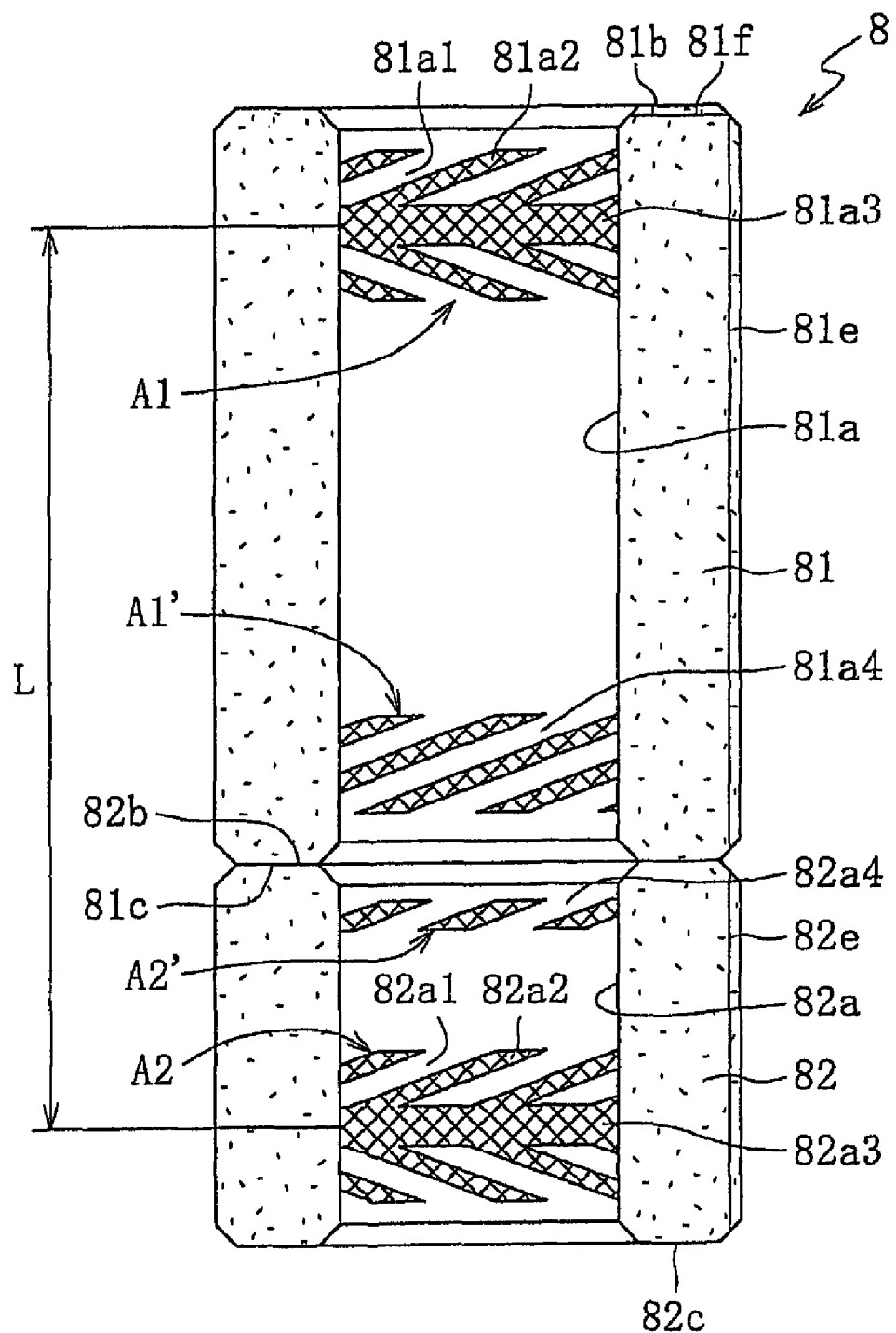
FIG. 9 is a view illustrating still another structure of the sleeve assembly.

In the sleeve assembly 8 illustrated in FIG. 9, the second radial bearing surface A1' of the first bearing sleeve 81 and the second radial bearing surface A2' of the second bearing sleeve 82 are provided with spiral inclined grooves 81a4 and 82a4, respectively, which are inclined in the same direction as each other. With formation of the inclined grooves 81a4 and 82a4, described above when the shaft member 2 is rotated, it is possible to pump the lubricating oil downward by the pumping effect of the inclined grooves 81a4 and 82a4. With provision of the generating portions of the pumping force separately from the first radial bearing surfaces, it is possible to decrease an asymmetrical amount (unbalance amount) in an axial direction of the first radial bearing surface A1 on the upper side (to reduce the difference between X1 and X2) illustrated in FIGS. 3(a) and 7, or to solve the asymmetry (to satisfy X1=X2). In this case, on the first radial bearing surface A1 on the upper side, the axial dimension X1 of the region on the upper side with respect to the axial center m is small. In this context, with increase in bearing span L of the sleeve assembly 8 with respect to those in the structures illustrated in FIGS. 3(a) and 7, it is possible to ensure larger moment rigidity.

Incidentally, in the case where the first and second bearing sleeves 81 and 82 are the same in axial length, owing to little difference in appearance therebetween, there is a risk that the operator incorporates both the sleeves in an upside-down manner upon assembly. In this context, as illustrated in FIG. 9, when the first and second bearing sleeves 81 and 82 are different in axial length, human errors of this type can be prevented. Also in the embodiment illustrated in each of FIGS. 3(a) and 7, when the first and second bearing sleeves 81 and 82 are different in length, the same effect can be expected.

The above-mentioned structure of the present invention is applicable not only to the fluid dynamic bearing device having the above-mentioned structure but also to the fluid dynamic bearing device having another structure. In the following, FIGS. 10 to 12 each illustrate another structural example of the fluid dynamic bearing device, and the same reference numerals are given to the members and portions of the same functions and effects as those in the structure of the above-mentioned embodiment, so the redundant description thereof is omitted.

Figure 10:
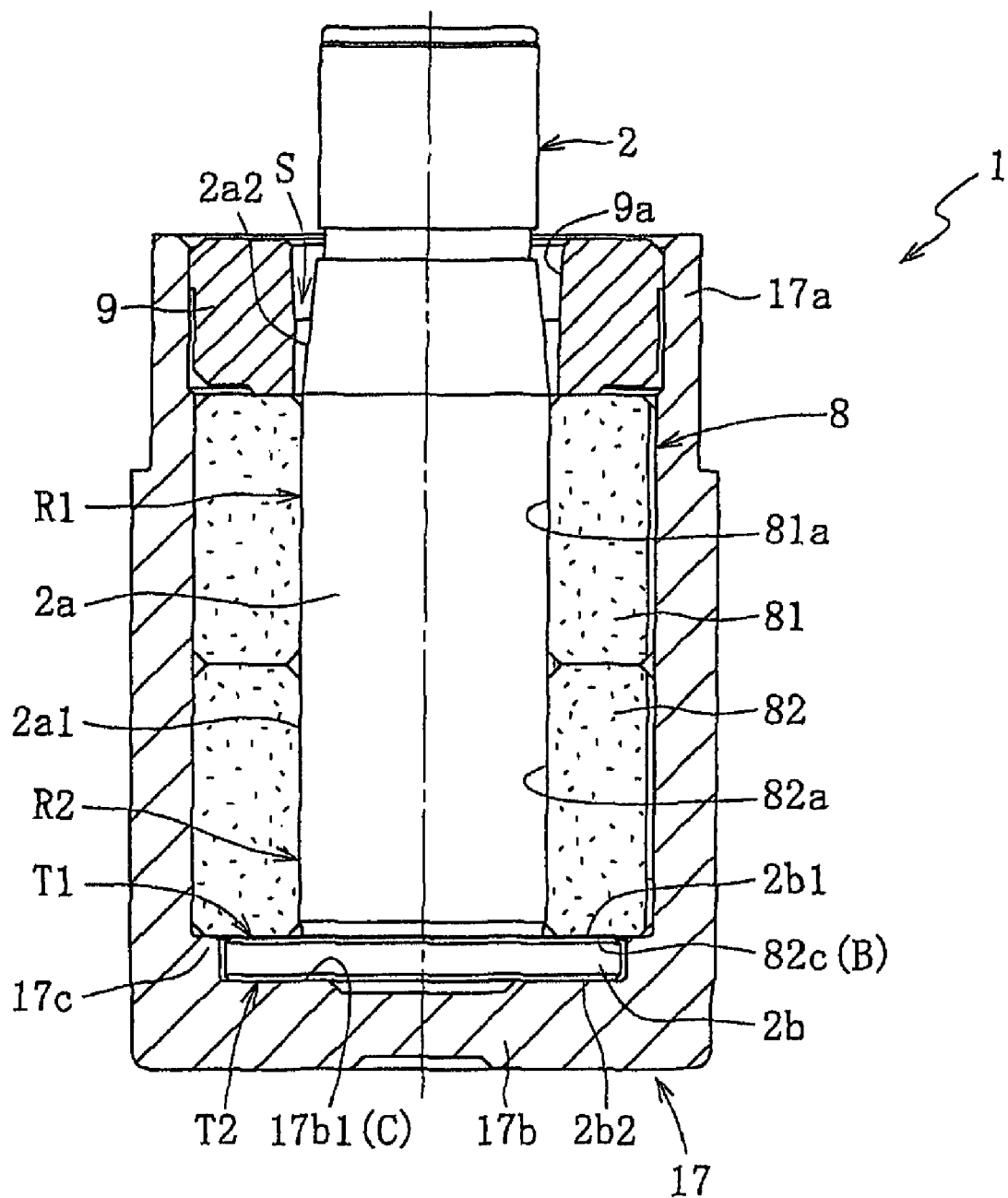
FIG. 10 is a sectional view illustrating another structure of the fluid dynamic bearing device.

The fluid dynamic bearing device 1 illustrated in FIG. 10 is structurally different from the fluid dynamic bearing device 1 illustrated in FIG. 2 mainly in that the lid member 10 is integrated with the housing 7. In this case, the sleeve assembly 8 accommodated in a housing 7 is subjected to axial positioning by a step portion 17c provided along the inner periphery of the bottom portion of the housing 7. The flange portion 2b of the shaft member 2 is accommodated in an axial space obtained by the step portion 17c.

Figure 11:
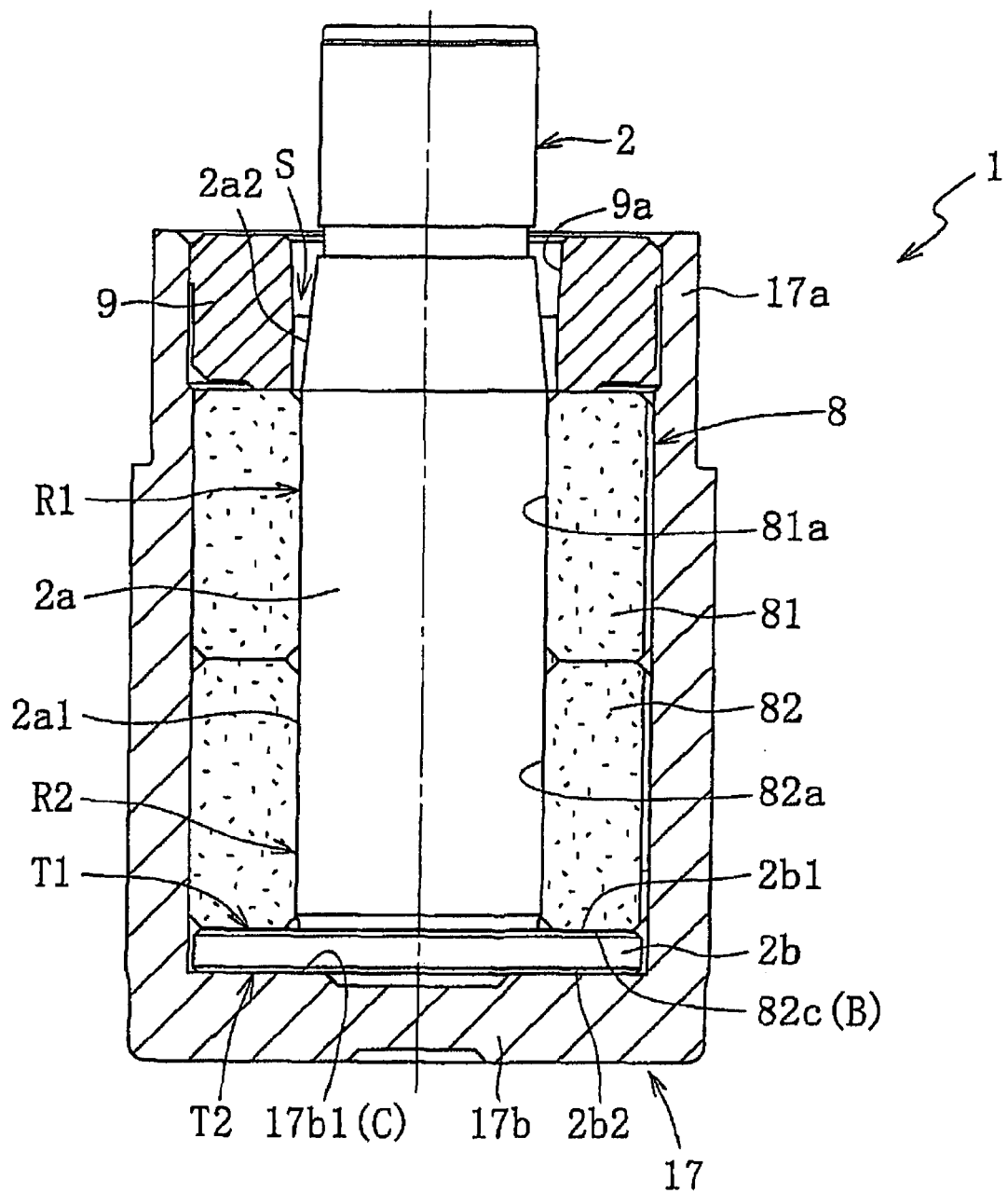
FIG. 11 is a sectional view illustrating still another structure of the fluid bearing device.

The fluid dynamic bearing device 1 illustrated in FIG. 11 is structurally different from the fluid dynamic bearing device 1 illustrated in FIG. 10 in that the step portion 17c of the housing 17 is omitted. In this case, in comparison with the fluid dynamic bearing device 1 having the structure illustrated in FIG. 10, support areas in the thrust bearing portions T1 and T2 are increased, thereby enhancing the load capacity to the moment load in the thrust bearing portions.

Figure 12:
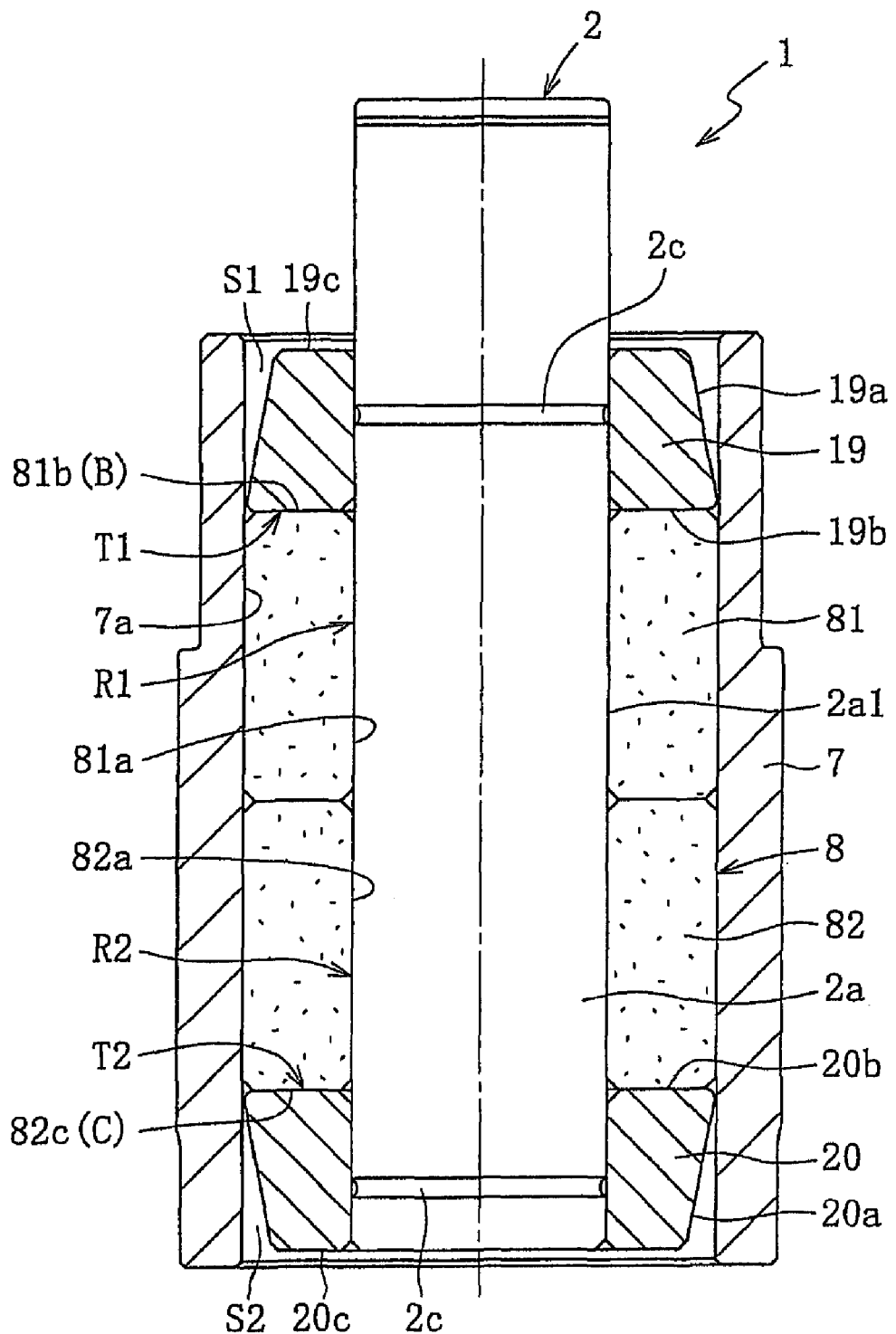
FIG. 12 is a sectional view illustrating yet another structure of the fluid bearing device.

The fluid dynamic bearing device 1 illustrated in FIG. 12 is structurally different from the fluid dynamic bearing device 1 illustrated in FIG. 2 mainly in that seal spaces S1 and S2 are provided to both the opening portions at the ends of the housing 7 and that thrust bearing portions T1 and T2 are provided at both ends of the sleeve assembly 8. In this case, the seal space S1 is formed between an outer peripheral surface 19a of a first seal member 19 fixed along the shaft member 2 and the inner peripheral surface of the opening portion at the upper end of the housing 7, and the seal space S2 is formed between an outer peripheral surface 20a of a second seal member 20 and the inner peripheral surface of the opening portion at the lower end of the housing 7. Further, the first thrust bearing portion T1 is provided between a lower end surface 19b of the first seal member 19 and the upper end surface 81b of the first bearing sleeve 81, and the second thrust bearing portion T2 is provided between an upper end surface 20b of the second seal member 20 and the lower end surface 82c of the second bearing sleeve 82. Note that, the sleeve assembly 8 of FIG. 12 is structurally different from the sleeve assembly 8 illustrated in the above-mentioned embodiment in that the thrust bearing surface B is formed on the upper end surface 81b of the first bearing sleeve 81 and the thrust bearing surface C is formed on the lower end surface 82c of the second bearing sleeve 82.

The fluid dynamic bearing device 1 having this structure is larger in gap distance between both the thrust bearing portions than the fluid dynamic bearing device 1 illustrated in FIG. 2, so it is possible to increase moment rigidity in the thrust bearing portions.

In the above description, the structure in which the dynamic pressure action of the lubricating oil is generated by the dynamic pressure groove of a herringbone shape, a spiral shape, or the like is taken as an example of the dynamic bearing and respective thrust bearing portions T1 and T2 of the radial bearing portions R1 and R2. However, the present invention is not limited thereto.

For example, as a dynamic bearing which constitutes the radial bearing portions R1 and R2, a so-called step bearing or a multi-arc bearing may be adopted.

Figure 13:
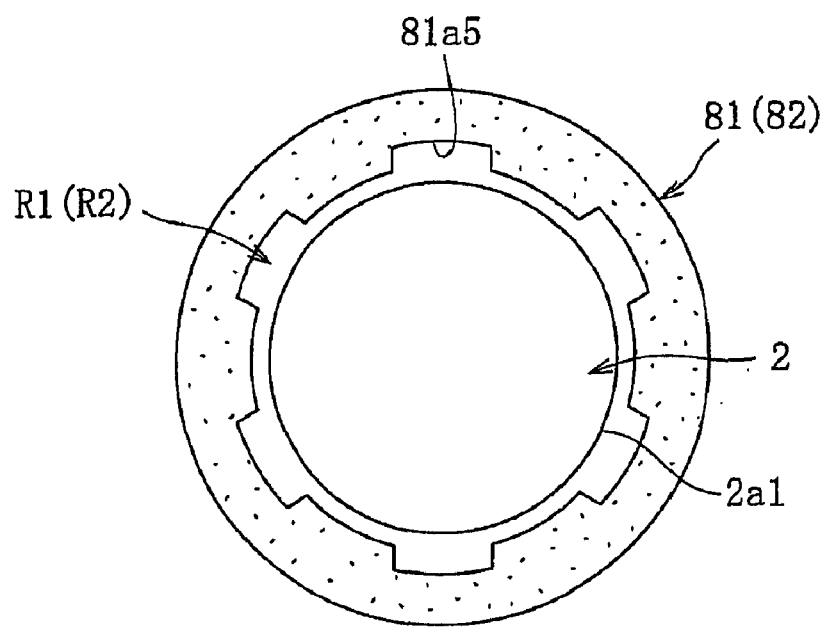
FIG. 13 is a sectional view illustrating another structure of a radial bearing portion.

FIG. 13 illustrates an example of the case where one of or both the radial bearing portions R1 and R2 is (are) constituted by the step bearing. In this example, in the region to be the first radial bearing surface on the inner peripheral surface of the first bearing sleeve 81 (second bearing sleeve 82) constituting the sleeve assembly 8, a plurality of dynamic pressure grooves 81a5 in the form of axial groove are provided at predetermined intervals in a circumferential direction.

Figure 14:
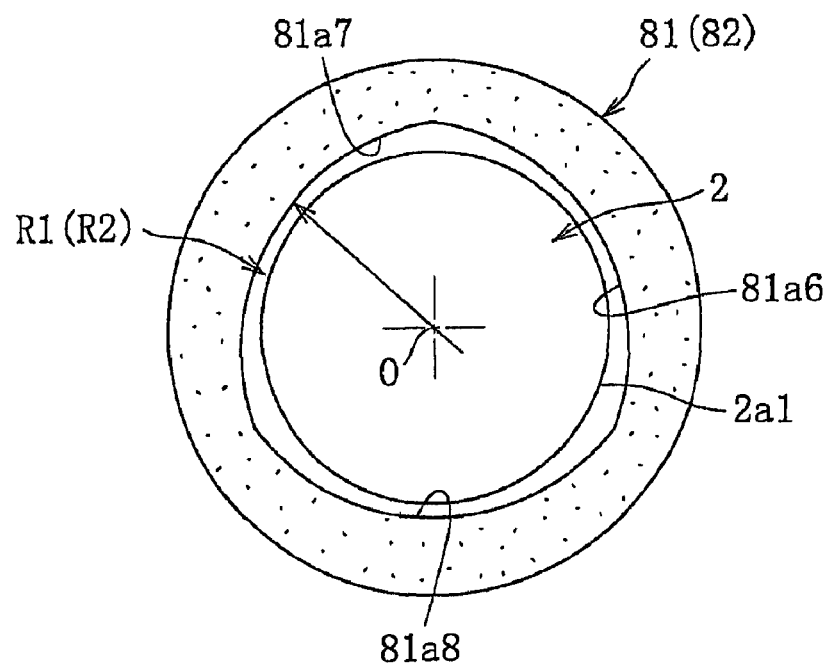
FIG. 14 is a sectional view illustrating still another structure of the radial bearing portion.

FIG. 14 illustrates an example of the case where one of or both the radial bearing portions R1 and R2 is (are) constituted by the multi-arc bearing. In this example, the region to be the first radial bearing surface of the inner peripheral surface of the first bearing sleeve 81 (second bearing sleeve 82) constituting the sleeve assembly 8 is constituted by three arcuate surfaces 81a6, 81a7, and 81a8 (so-called three-arc bearing). The centers of curvature of the three arcuate surfaces 81a6, 81a7, and 81a8 are offset from an axial center O of the sleeve assembly 8 (shaft portion 2a) by the same distance. In each of the regions partitioned by the three arcuate surfaces 81a6, 81a7, and 81a8, the radial bearing gap is gradually diminished in a wedge-like manner in both circumferential directions. Thus, when the sleeve assembly 8 and the shaft portion 2a make relative rotation, the lubricating oil in the radial bearing gap is pumped into the side of the minimum gaps diminished in a wedge-like manner according to the direction of the relative rotation, and undergoes an increase in pressure. By this dynamic pressure action of the lubricating oil, the sleeve assembly 8 and the shaft portion 2a are supported in a non-contact manner. Note that, axial grooves one step deeper and called separation grooves may be formed into the boundary portions between the three arcuate surfaces 81a6, 81a7, and 81a8.

Figure 15:
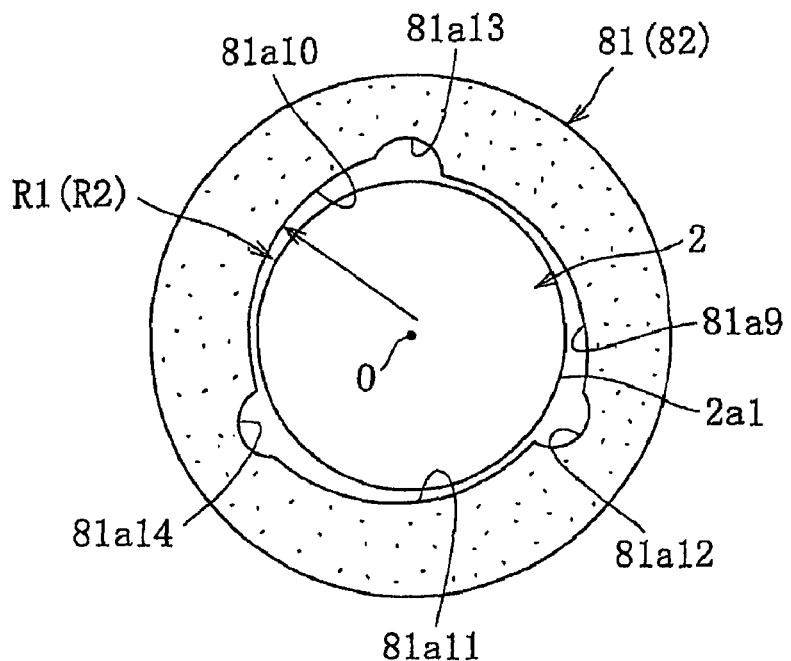
FIG. 15 is a sectional view illustrating yet another structure of the radial bearing portion.

FIG. 15 illustrates another example of the case where one of or both the radial bearing portions R1 and R2 is (are) constituted by the multi-arc bearing. While in this example as well, the region to be the first radial bearing surface of the inner peripheral surface of the first bearing sleeve 81 (second bearing sleeve 82) constituting the sleeve assembly 8 is constituted by three arcuate surfaces 81a9, 81a10, and 81a11 (so-called three-arc bearing), in each of the regions partitioned by the three arcuate surfaces 81a9, 81a10, and 81a11, the radial bearing gap is gradually diminished in a wedge-like manner in one circumferential direction. The multi-arc bearing thus structured may be called a taper bearing. Further, axial grooves 81*a*12, 81*a*13, and 81*a*14 which are one step deeper and called separation grooves are formed into the boundary portions between the three arcuate surfaces 81*a*9, 81*a*10, and 81*a*11. Thus, when the sleeve assembly 8 and the shaft portion 2*a* make relative rotation, the lubricating oil in the radial bearing gap is pumped into the side of the minimum gaps diminished in a wedge-like manner, and undergoes an increase in pressure. By this dynamic pressure action of the lubricating oil, the sleeve assembly 8 and the shaft portion 2*a* are supported in a non-contact manner.

Figure 16:
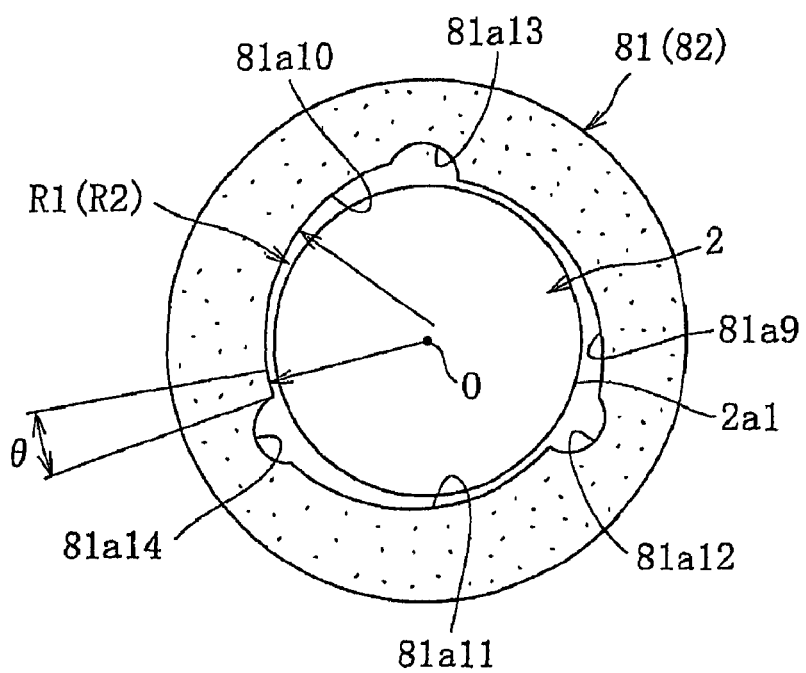
FIG. 16 is a sectional view illustrating still another structure of the radial bearing portion.

FIG. 16 illustrates still another example of the case where one of or both the radial bearing portions R1 and R2 is (are) constituted by the multi-arc bearing. In this example, in the structure illustrated in FIG. 15, a predetermined region θ on the side of the minimum gap of each of the three arcuate surfaces 81*a*9, 81*a*10, and 81*a*11 is constituted by a concentric arc, the center of curvature of which is the axial center O of the sleeve assembly 8 (shaft portion 2*a*). Accordingly, in each of the predetermined regions θ, the radial bearing gap (minimum gap) is fixed. The multi-arc bearing thus structured may be called a taper flat bearing.

The multi-arc bearing in each of the examples is a so-called three-arc bearing. However, the present invention is not limited thereto, and may adopt a so-called four-arc bearing, five-arc bearing, and multi-arc bearing constituted by six or more numbers of arc surfaces.

Further, it is also possible to constitute one or both of the thrust bearing portions T1 and T2, for example, as a so-called step bearing or a corrugated bearing (with a corrugated step form) in which a plurality of dynamic pressure grooves in the form of radial grooves are provided at predetermined circumferential intervals in the region to be the thrust bearing surface (not shown).

Further, the above description is made of the mode in which the sleeve assembly 8 is constituted by the two bearing sleeves 81 and 82 aligned in an axial direction. However, the sleeve assembly 8 is constituted by three or more bearing sleeves aligned in an axial direction.

Still further, in the above description, the structure is taken as an example in which the two bearing sleeves 81 and 82 are held contact at end surfaces with each other. However, those end surfaces are not necessarily brought into contact with each other. It is also possible to dispose both the sleeves 81 and 82 apart from each other in an axial direction, and possible to dispose a spacer in a gap between both the sleeves 81 and 82. When the spacer is formed of a material having oil impregnation property, such as an oil-bearing metal or an oleoresin, it is possible to ensure the function of feeding the oil to the bearing sleeves 81 and 82.

Yet further, in the above description, the mode is taken as an example in which the fluid dynamic bearing device is incorporated in the spindle motor for the disc apparatus and is used. However, the fluid dynamic bearing device having the structure of the present invention may be preferably used together with motors except the spindle motor which is rotated at high speed and requires high moment rigidity (not shown).

Note that, in the above description, the lubricating oil is taken as an example of a fluid filled inside the fluid dynamic bearing device 1. However, otherwise, the fluid capable of generating the dynamic pressure in the bearing gaps, for example, the gas such as air, or magnetic fluid may be used.

The invention claimed is:

1. A fluid dynamic bearing device, comprising:
   bearing sleeves each having a radial bearing surface;
   a housing fixing the bearing sleeves;
   a shaft member inserted into an inner periphery of the bearing sleeves; and
   a radial bearing gap formed by being isolated in an axial direction between the radial bearing surface of the bearing sleeves and an outer peripheral surface of the shaft member,
   wherein a plurality of the bearing sleeves are arranged in the axial direction, and, while the respective bearing sleeves are in fixed states to the housing, coaxiality of the radial bearing surfaces of the respective bearing sleeves is set to 3 μm or less, and
   wherein an outer peripheral surface of the bearing sleeves is gap-bonded to an inner peripheral surface of the housing.

2. A fluid bearing device according to claim 1, wherein end surfaces of the adjacent bearing sleeves are brought into contact with each other.

3. A fluid bearing device according to claim 1, further comprising a dynamic pressure generating portion for generating a dynamic pressure action to a lubricating fluid of the radial bearing gap.

4. A motor, comprising: the fluid dynamic bearing device according to claim 1; a rotor magnet; and a stator coil.

* * * * *